US011210523B2

(12) United States Patent
Geng et al.

(10) Patent No.: US 11,210,523 B2
(45) Date of Patent: Dec. 28, 2021

(54) SCENE-AWARE VIDEO DIALOG

(71) Applicant: Mitsubishi Electric Research Laboratories, Inc., Cambridge, MA (US)

(72) Inventors: Shijie Geng, Piscataway, NY (US); Peng Gao, Cambridge, MA (US); Anoop Cherian, Belmont, MA (US); Chiori Hori, Lexington, MA (US); Jonathan Le Roux, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 86 days.

(21) Appl. No.: 16/783,538

(22) Filed: Feb. 6, 2020

(65) Prior Publication Data

US 2021/0248375 A1    Aug. 12, 2021

(51) Int. Cl.
*G06K 9/00* (2006.01)
*G06F 16/9035* (2019.01)
*G06K 9/62* (2006.01)
*G06N 3/08* (2006.01)

(52) U.S. Cl.
CPC ..... *G06K 9/00718* (2013.01); *G06F 16/9035* (2019.01); *G06K 9/0063* (2013.01); *G06K 9/623* (2013.01); *G06N 3/08* (2013.01)

(58) Field of Classification Search
CPC .. G06K 9/00718; G06K 9/0063; G06K 9/623; G06N 3/08
See application file for complete search history.

(56) References Cited

U.S. PATENT DOCUMENTS

| 2008/0263012 A1* | 10/2008 | Jones ................ G09C 1/00 |
| 2009/0074235 A1* | 3/2009 | Lahr ............. G06F 3/04842 |
| | | 382/100 |
| 2019/0019037 A1 | 1/2019 | Kadav |

(Continued)

OTHER PUBLICATIONS

Hori et al. "End to End Audio Visual Scene Aware Dialog using Multimodal Attention Based Video." ARXIV Cornell University Library, Jun. 1, 2018.

(Continued)

*Primary Examiner* — Fayyaz Alam
(74) *Attorney, Agent, or Firm* — Gennadiy Vinokur; Hironori Tsukamoto

(57) ABSTRACT

A scene aware dialog system includes an input interface to receive a sequence of video frames, contextual information, and a query and a memory configured to store neural networks trained to generate a response to the input query by analyzing one or combination of input sequence of video frames and the input contextual information. The system further includes a processor configured to detect and classify objects in each video frame of the sequence of video frames; determine relationships among the classified objects in each of the video frame; extract features representing the classified objects and the determined relationships for each of the video frame to produce a sequence of feature vectors; and submit the sequence of feature vectors, the input query and the input contextual information to the neural network to generate a response to the input query.

25 Claims, 17 Drawing Sheets

(56) References Cited

U.S. PATENT DOCUMENTS

2019/0304157 A1\* 10/2019 Amer .................. G06N 3/0454

OTHER PUBLICATIONS

Le, Hung; Sahoo, Doyen; and Chen, Nancy F. Choi. Multimodal transformer networks for end-to-end video-grounded dialogue systems. (2019).Proceedings of the 57th Annual Meeting of the Association for Computational Linguistics, Florence, Italy, Jul. 28, 2019 Aug. 2. 5612-5623. Research Collection School Of Information Systems. Available at:https://ink.library.smu.edu.sg/sis_research/4428.

\* cited by examiner

| Video 602 | Video caption 604 | Dialog history 606 | Query 608 | Reference answer 610 | Generated answers 612 |
|---|---|---|---|---|---|
| Video-1 | "a man walks into the room carrying a folder, that he throws on a pile of clothes. He then picks up a vacuum, turns it on and vacuums. Then shuts it off, and sneezes four times." | "Query: is the machine a vacuum cleaner? Answer: yes, the machine is a vacuum cleaner. Question: What does he do with the folder? Answer: He throws the folder on a pile of clothes." | "what does the room look like?" | "I'm not sure- it has a washing machine in it, so maybe a laundry room?" | -It looks like a laundry room. (3.412178) <br> -I think it is a laundry room. (3.339360) <br> -It looks like a laundry room or laundry room. (2.550084) <br> -It looks like the laundry room." (2.502050) |
| Video-2 | "a girl is standing and cooking at the stovetop. She is sipping on a coffee cup and she stirs what is in the pan." | "Query: is there just one person in the video? Answer: yes, there is only one person in the video. Query: is the woman talking? Answer: no, the woman is not talking. | "is she in the room the whole time?" | "Yes she is that room the whole time" | -Yes she is in the room the whole time. (6.789616) <br> -Yes she is in the room the whole time the whole time. (6.629749) <br> -Yes she is in the same room the whole time. (6.362943) <br> -Yes she is in the kitchen the whole time. (6.235850) <br> -Yes she is in the kitchen the whole time the whole time. (5.961289) |

FIG. 6

| Method | AVSD@DSTC7 | | | | | | | |
|---|---|---|---|---|---|---|---|---|
| | BLUE-1 | BLUE-2 | BLUE-3 | BLUE-4 | METEOR | ROUGE L | CIDEr |
| Full model | 0.362 | 0.249 | 0.179 | 0.133 | 0.165 | 0.361 | 1.265 |
| w/o shuffle | 0.354 | 0.242 | 0.172 | 0.127 | 0.161 | 0.354 | 1.208 |
| w/o GAT | 0.337 | 0.227 | 0.161 | 0.118 | 0.160 | 0.347 | 1.125 |
| w/o EdgeConv | 0.358 | 0.244 | 0.176 | 0.131 | 0.162 | 0.356 | 1.244 |
| w/o union box feature | 0.354 | 0.239 | 0.170 | 0.124 | 0.163 | 0.352 | 1.175 |
| w/o semantic graph | 0.356 | 0.241 | 0.172 | 0.127 | 0.160 | 0.356 | 1.203 |
| w/o temporal | 0.355 | 0.240 | 0.170 | 0.125 | 0.164 | 0.357 | 1.212 |

FIG. 9

| Method | feature | #Refs | BLUE-4 | METEOR | ROUGE L | CIDEr |
|---|---|---|---|---|---|---|
| Baseline | i3d rgb+flow+VGGish | 1 | 0.075 | 0.110 | 0.275 | 0.701 |
| Multimodal Attention | i3d rgb+flow+VGGish | 1 | 0.078 | 0.113 | 0.277 | 0.727 |
| Simple | i3d rgb+flow | 1 | 0.091 | 0.125 | 0.307 | 0.883 |
| MTN | i3d flow | 1 | 0.118 | 0.160 | 0.348 | 1.151 |
| MTN | i3d flow+VGGish | 1 | 0.128 | 0.162 | 0.355 | 1.249 |
| STSGR | scene graph | 1 | 0.133 | 0.165 | 0.361 | 1.265 |

FIG. 10A

| Method | Feature | #Refs | BLUE-4 | METEOR | ROUGE L | CIDEr |
|---|---|---|---|---|---|---|
| Baseline | i3d rgb+flow | 6 | 0.289 | 0.21 | 0.48 | 2.885 |
| Simple | i3d rgb+flow | 6 | 0.311 | 0.224 | 0.502 | 3.064 |
| STSGR | scene graph | 6 | 0.357 | 0.267 | 0.553 | 3.433 |

SCENE-AWARE VIDEO DIALOG

TECHNICAL FIELD

The present invention relates generally to video scene aware recognition, and more particularly to methods and system for generating a response relevant to a query of a video in a video dialog system.

BACKGROUND

Daily communication among humans is conveyed closely with different modalities of information (such as visual information and audio information) about surrounding objects and events. For machines to converse with the humans about those objects and events, multi-modal reasoning is required. For such multi-modal reasoning, there is a need to generate effective models of dynamic audio-visual scenes. The machines infer about those objects and events based on the models and generate responses to queries of the humans. Recently, such multi-modal reasoning problem has been formalized through audio visual scene aware dialog (AVSD) system. Some applications of the AVSD system include end-to-end dialogs, visual question answering (VQA), and video captioning. The AVSD system is used for supporting conversations between the humans and machines. To support the conversations, the AVSD system requires ability to model audio-visual scenes and previous dialog context using multi-modalities (such as audio, video, query and multi-turn dialog history) jointly, and to generate responses in free-form natural language. Such an AVSD task is challenging due to difficulty in capturing various information, such as video dynamics contained in all modalities. Some modalities may be complementary, while some modalities may be independent from or even in conflict with each other. For instance, modalities like natural language and video (or audio) information are required for the AVSD task. However, in some cases the video may be independent of the natural language and/or the natural language information and the audio information may contain similar information.

Typically, neural networks are trained to capture the video dynamics through encoded spatio-temporal representations of a video. However, such neural networks are usually trained for only human action recognition and the corresponding spatio-temporal representations lack information about objects in the video that are required for understanding a scene in the video. The information about the objects includes movements of the objects in the scene in the video or relationships among the objects in the scene in the video. Accordingly, such information related to the objects in the scene is important and is required for representing the scene. Further, a response to a query of a video may be generated based on features that are extracted by processing the entire video. Such features represent global features that are indicative of actions in the video. However, it is impractical to process and analyze the entire video in its raw format to extract such global features for generating the response. A few video frames may be sampled from the entire video for extracting the features. However, such features may fail to model finer-grained details to learn more detailed information about the objects and actions in the video. The lack of detailed information may result in generating an inaccurate response to the query.

Accordingly, there is a need to extract features of the video for generating a response to a query, in an accurate and a natural form of language. More specifically, there is a need to extract the features that include representations of an entire scene in the video in order to generate a response to a query from a user.

SUMMARY

Audio-Visual Scene-Aware Dialog (AVSD) systems are visually aware dialog systems to solve problems of carrying out a conversation in a natural language and providing answers to queries about a video. Typically, these queries are related to actions performed in the video. For example, a user may ask a query about a person shown in the video (for example, the query may be "what is a person doing in a video?"). Moreover, scenes in the video vary with respect to time-level information as well as frame-level information. If a scene in first 10 frames of the video changes after 5 seconds, then the user may be required to again ask a follow-up query after getting response of the previous query. At such a time, the AVSD system is required to generate a response relevant to the later query.

It is an object of some embodiments to provide a system and a method for generating a response to a query of a video. Additionally, or alternatively, it is another object of some embodiments to extract feature representing a scene of the video that is optimal for generating a relevant response to the query. The query may inquire about actions as well as about objects in a scene of the video. Additionally, or alternatively, it is another object of some embodiments to process a video associated with audio, and previous questions-answers about the video to automatically generate responses to queries about the video. For instance, a query asks about a boy with a book in a video scene. Another query can ask about an object, such as the book. In such case, a relevant answer to the query is a response describing about the book. In some embodiments, for feature extraction of the video, each video frame is represented individually to capture objects and their relationships in the scene and a collection of the video frames represents temporal evolution of the objects and their relationships.

To that end, some embodiments are based on realization that a representation of a scene adapted for scene understanding, captures features of objects in the scene, relationships among the objects, and temporal evolutions of the objects and their relationships or actions to perform a spatio-temporal reasoning. A temporal evolution of the objects and their relationships is represented by a collection or a sequence of video frames of the video. In some embodiments, the spatio-temporal reasoning is performed based on spatio-temporal scene graph representation (STSGR). The STSGR represents the objects as well as the relationship among them. The STSGR also provides an alternative data-structure to efficiently store object representations in a memory. To implement such a spatio-temporal feature representation (i.e., STSGR), some embodiments, in addition and instead of capturing the actions in the video, detect and classify objects in each video frame of the video. Further, the objects in each video frame can have relationships with other objects in the video frame. To that end, some embodiments determine the relationships among the classified objects. The embodiments treat the scene graph within the framework of a graph neural network to perform the spatio-temporal reasoning via neural message passing, where the neural message passing enables flow of information (such as video caption, video dialog history, audio) between the objects and relationships in the STSGR. Simultaneously, the embodiments also use inferred graph labels to control information flow between query, dialog history, video, and audio in the STSGR. The inferred graph labels correspond to labeled nodes and labeled edges with highest weights computed by of a pre-trained neural network, such as graph-based neural network for node classification. Some embodiments are based on realization that scene graph representations of different frame level have different number of nodes. To that end, some embodiments adopt graph average pooling and graph maximum pooling for performing intra-graph reasoning, where the intra-graph reasoning corresponds to performing graph reasoning of the classified objects and their determined relationships within a single graph of the scene. The intra-graph reasoning is performed to generate frame memories or graph memories representing features corresponding to visual and semantic scene graphs of the video frames in the STSGR.

Additionally, or alternatively, it is another object of some embodiments to extract features representing the classified objects and the determined relationships among the classified objects. To that end, the extracted features from each of the video frame are represented as the scene graph representation representing the objects as nodes and the relationship of the objects as edges. Furthermore, a sequence of scene graph representations corresponding to a sequence of video frames of the video are generated. Some embodiments are based on realization that key video frames from the video are extracted for generating the sequence of scene graph representations. The key frames can be extracted using several key frame extraction methods, such as cluster-based key frame extraction, visual based key frame extraction, motion analysis based key frame extraction or the like. Some embodiments extract the key frames based on features extracted from models trained on datasets for AVSD applications (e.g., VisualGenome dataset). For example, for an AVSD application in soccer sports video, key frames are extracted based on features extracted from datasets that include players in soccer field, soccer ball with the players, or the like. In some other embodiments, the key frames are extracted by discarding redundant video frames of the video.

To that end, the features extracted for the video are aligned with types of queries accepted by the AVSD system to improve accuracy of AVSD responses. Some embodiments use neural networks for processing the video to generate the responses. In some embodiments, neural networks trained to generate such responses are utilized. The neural networks correspond to an attention-based network architecture. The attention-based neural networks compute attention coefficient for different modalities of input information. The attention coefficient provides weights on the video frames relevant to the query in preparing the response that are relevant to the queries. To that end, some embodiments add temporal features in each feature vector of each video frame. A feature vector is an aggregation of multiple feature vectors centered on that feature vector. In such a manner, each feature vector represents features about objects and their relationships in corresponding video frame as well as similar features about the objects and their relationships in the neighboring video frames. Thus, the neural networks generate a sequence of feature vectors for a sequence of video frames of a video. The sequence of feature vectors is aggregated with features of the temporal evolutions. To that end, temporal features are added in each feature vector of each video frame. Further, some embodiments spread information from each individual feature vector to neighboring feature vectors. Examples of such neural networks include encoder/decoder neural network with attention-based decoder, transformer, or the like. After aligning the spatial-temporal features with other multi-modality features, a feature vector representing dynamic features of the video is extracted for generating the relevant responses.

Some embodiments are based on recognition that performance of the AVSD system can be further improved by tuning object detection to specific objectives of the AVSD system. For example, in some embodiments, the object detection is generic in such a way that only a specific number of objects are detected and are classified. In some embodiments, the objects are detected by an object classifier and the relationships among the objects are determined by a relationship classifier. In one implementation, the object classifier is a neural network trained to detect about 2000 object classes. Thus, the object classifier does not detect entire objects in the video frames. For instance, in a video frame, top 36 of the detected classes is selected for the object detection. This embodiment is advantageous for generic application of AVSD systems.

To that end, the object classifier and the relationship classifier are selected from a set of neural-network based classifiers. The selected classifiers can be used for different types of videos irrespective of the video context. In some other embodiments, the object classifiers are selected based on contextual information. For example, the contextual information can include caption indicating the type of the video, and the AVSD system selects the object classifier matching or at least the most relevant to the identified type of the video. Additionally, or alternatively, in some embodiments, the AVSD system determines the type of the video based on its context. Additionally, or alternatively, in some embodiments, the AVSD system determines the type of the video based on a type of the query. For example, if the query asks which teams are playing this soccer game, then the AVSD system determines that the video is probably about a soccer game.

Additionally, or alternatively, some embodiments vary different object detections for different applications. For example, object detection for driving application configured to reply to queries related to navigating a vehicle may be different from object detection configured for sport events and/or movies. Even in the category of sport events, different games, such as soccer or badminton may need to be configured to recognize different objects and different relationships. To that end, different embodiments use different object detection modules configured to detect and classify different types of object. Moreover, some embodiments are configured to select different object detection modules based on types of the queries and/or videos.

Accordingly, one embodiment discloses a scene-aware dialog system for generating a response to a multi-modal query, which includes an input interface configured to receive a sequence of video frames, contextual information, and a query; a memory configured to store at least one neural network trained to generate a response to the input query by analyzing one or combination of input sequence of video frames and the input contextual information provided to the neural network; a processor configured to detect and classify objects in each video frame of the sequence of video frames; determine relationships among the classified objects in each of the video frame, wherein at least one video frame of the sequence of video frames includes at least two classified objects, and wherein the relationship between the two classified objects is an intra-frame object relationship confined within the video frame; extract features representing the classified objects and the determined relationships for each of the video frame to produce a sequence of feature vectors, wherein there is one feature vector for one video frame; and submit the sequence of feature vectors, the input query and the input contextual information to the neural network to generate a response to the input query; and an output interface to render the response to the input query.

Another embodiment discloses a method for generating a response to a multi-modal query, wherein the method includes receiving a sequence of video frames, contextual information, and a query; detecting and classifying objects in each video frame of the sequence of video frames; determining relationships among the classified objects in each of the video frame, wherein at least one video frame of the sequence of video frames includes at least two classified objects, and wherein the relationship between the two classified objects is an intra-frame object relationship confined within the video frame; extracting features representing the classified objects and the determined relationships for each of the video frame to produce a sequence of feature vectors, wherein there is one feature vector for one video frame; submitting the sequence of feature vectors, the input query and the input contextual information to at least one neural network trained to generate a response to the input query by analyzing one or combination of input sequence of video frames and the input contextual information; and rendering the response to the input query via an output interface.

BRIEF DESCRIPTION OF THE DRAWINGS

FIG. 6 shows a schematic of a table including information of a sequence of video frames, contextual information and the input query, according to some embodiments.

FIG. 9 shows a table depicting ablation analysis on components of the AVSD system of FIG. 1, according to some embodiments.

FIG. 10A shows a table depicting comparison of the AVSD system with baseline methods on test split of AVSD challenge at Dialog System Technology Challenge 7 (DSTC7), according to some embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

System Overview

Figure 1:
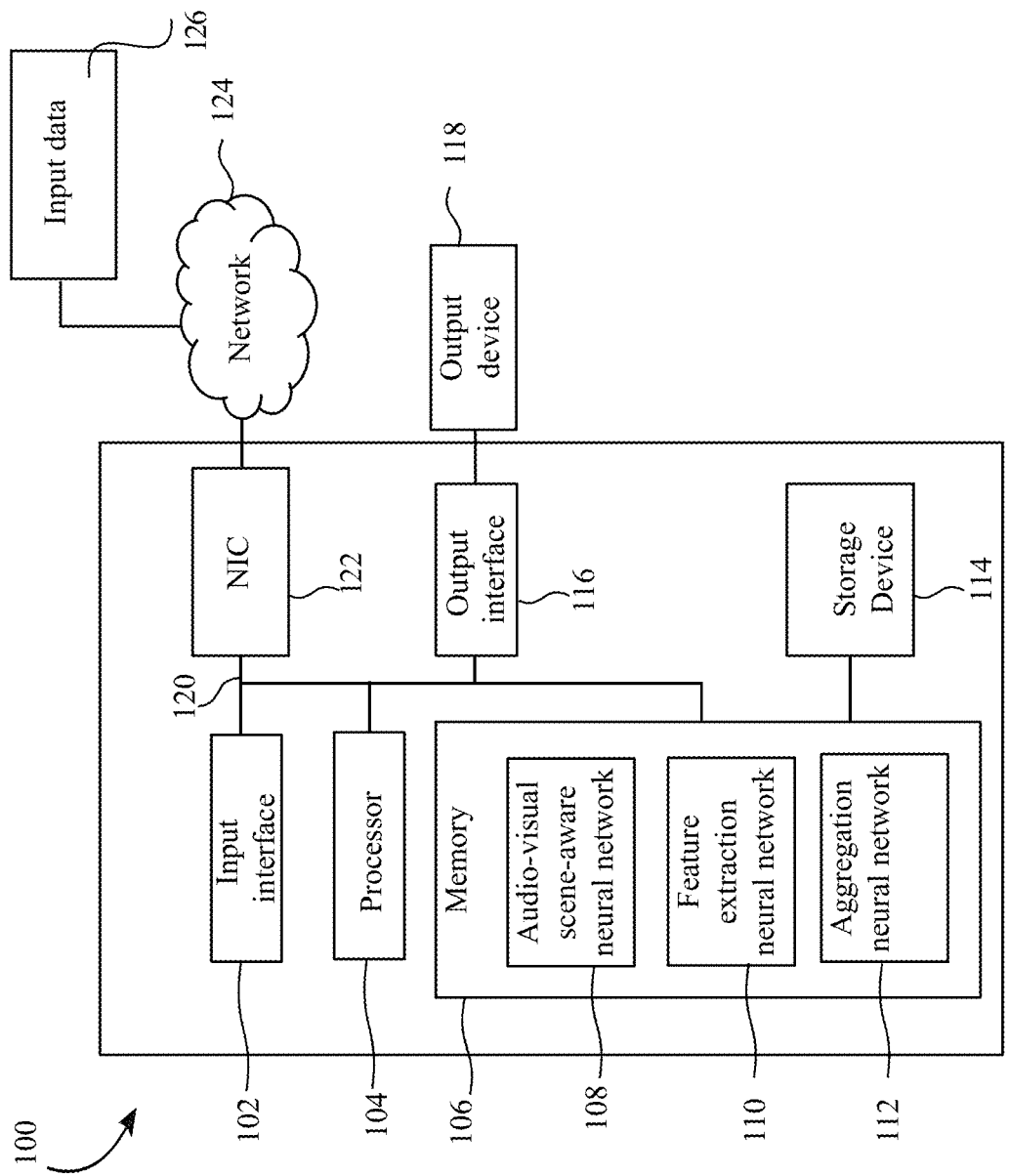
FIG. 1 shows a schematic of an audio visual scene aware dialog (AVSD) system for generating a response to a query, according to some embodiments.

FIG. 1 shows a schematic of an audio visual scene aware dialog (AVSD) system 100 for generating a response to a query, according to some embodiments. The AVSD system 100 includes an input interface 102, a processor 104, a memory 106, a storage device 114, and an output interface 116. The input interface 102 is configured to receive input data 126 comprising a sequence of video frames of video, contextual information and a query. The input data 126 corresponds to multi-modal information, such as audio, video, textual, or the like. The AVSD system 100 receives the input data 126 via network 124 using network interface controller (NIC) 122. In some cases, the video may be a live stream video received via the network 124. In some other cases, the video may be an offline video stream or a recorded video, where the offline video stream may be stored in the storage device 114. The storage device 114 is also configured to store the contextual information, where the contextual information includes one or combination of audio information and textual information about the input video (such as video captions, history of video question answering dialogs, or the like).

The processor 104 is configured to detect and classify objects in each video frame of the sequence of video frames. The processor 104 is further configured to determine relationships among the objects in each video frame of the sequence of image frames and extract features representing the objects and their relationships in each video frame in order to generate a sequence of feature vectors. Each feature vector of the sequence of feature vectors corresponds to a corresponding video frame of the sequence of video frames. The processor 104 is further configured to submit the sequence of feature vectors, the query and the contextual information to one or more neural networks stored in the memory 106 to generate a response to the query, where the query concerns one or combination of objects, relationships among the objects, and temporal evolutions of the objects in the input sequence of video frames. The one or more neural networks are trained to generate the response to the query by analyzing one or combination of the input sequence of video frames and the input contextual information such that the one or more neural networks are multi-modal neural networks configured to process information of modalities. The one or more trained neural networks include an audio-visual scene aware neural network 108, a feature extraction neural network 110 and an aggregation neural network 112.

For example, the audio-visual scene aware neural network 108 is trained to process features (e.g., scene graph representations) that represent scene in each video frame of the sequence of video frames to generate a response. Examples of the audio-visual scene aware neural network 108 include one or combination of a faster region-based convolutional neural network (faster RCNN) and a 3-dimensional (3D) convolutional neural network (CNN). The scene graph representations provide spatial information of the each video frame that includes features of objects in each video frame and relationships among the objects. The processor 104 is further configured to combine the spatial information with temporal information of each video frame to generate a spatio-temporal scene graph representation (STSGR) model. More specifically, the processor 104 generates the STSGR model for each video frame of the sequence of video frames based on an integrated region of interests. Further, the one or more neural networks are trained to utilize each STSGR model for performing spatio-temporal learning on training STSGR models of the sequence of video frames such that a relevant response to the query is generated. The spatio-temporal reasoning captures visual and semantic information flows inside videos, accordingly each STSGR model represents each corresponding video frame as a spatio-temporal visual graphs stream and a semantic graph stream. This allows an object-level graph reasoning for generating responses relevant to queries for the video. In some embodiments, the one or more neural networks are multi-head shuffled transformers for generating the object-level graph reasoning, where the multi-head shuffled transformers enable shuffling heads of the sequence of feature vectors.

In some embodiments, the audio-visual scene aware neural network 108 corresponds to an attention-based network architecture that computes attention coefficient for each edge in the scene graph representation. The attention coefficient provides values that determine importance between two linked nodes of a graph, such as the STSGR. The attention coefficient is utilized to selectively focus on salient features, such as the classified objects and the relationships for the spatio-temporal reasoning.

Further, the processor 104 is configured to extract feature vectors from the generated scene graph representations by utilizing the feature extraction neural network 110. The feature extraction neural network 124 corresponds to a pre-trained neural network that extracts the feature vectors from the generated scene graph representation and generates a sequence of feature vectors corresponding to the sequence of scene graph representation of the sequence of video frames. Further, the processor 104 is configured to modify values of each feature vector of the sequence of feature vectors with weighted values of neighboring feature vectors in the sequence of feature vectors.

In particular, the feature extraction neural network 110 performs a frame-level intra-graph reasoning for extracting the feature vectors. The feature vectors herein correspond to visual graph memories of the sequence of scene graph representations.

In one implementation, the intra-graph reasoning is performed by aggregating node-based features (i.e. object features) of the scene graph representations and aggregating edge-based features (i.e. relationship features) of the scene graph representations. Further, the intra-graph reasoning uses an attention based neural network for computing a weight value (i.e. a self-attention value) for a pair of linked nodes. The weight value indicates importance of a node paired to another node. In a similar manner, weights of other paired nodes are determined using the attention based neural network. Further, a weighted sum of neighboring nodes (i.e. neighboring objects) in the scene graph representation is computed based on all the weight values. The processor 104 updates features of each node in each corresponding scene graph representation based on the weighted sum.

Furthermore, the processor 104 provides the weighted sum as input to a relationship neural network. In one implementation, the relationship neural network corresponds to a multi-layer fully connected network for generating relationship features from two connected node features of the updated scene graph representation. Thus, the updated scene graph representations are pooled into visual graph memories that provide the sequence of feature vectors. The sequence of feature vectors represents spatial representations and temporal representations of the input data 126. Further, to determine each feature vector of the sequence of feature vectors, the aggregation neural network 110 aggregates values of multiple feature vectors fitting a window centered on the feature vector. Such a feature vector of the sequence of feature vectors is a weighted combination of the values of the multiple feature vectors fitting the window centered on that feature vector. This allows aggregation of similar features about the objects and their relationships in neighboring video frames. The processor 104 is configured to utilize each feature vector of the sequence of feature vectors for generating the response to the query. Further, the generated response to the query is rendered on an output device 118 via the output interface 116. The output device 118 includes, but not limited to, a computer, a laptop, a tablet, a phablet, or any display device. In some implementations, the output device 118 may include an application interface for rendering the response.

In some embodiments, in order to improve efficiency of the AVSD system 100, the processor 104 may be configured to extract a set of key frames from the sequence of video frames. The set of key frames includes video frames that represent transition in movement of a person or an object in the sequence of video frames of the video. The processor 104 may be configured to extract the set of key frames based on pre-trained models (e.g. Visual Genome) for AVSD applications. The extraction of the set of key frames enables the processor 104 to efficiently process the video frames (i.e. the set of key frames) to generate the response to the query of the video, as a number of video frames from the sequence of video frames required to be processed is reduced. Accordingly, utilization of the key frames facilitates an efficient AVSD system (i.e. the AVSD system 100) to generate a response to a query for a video.

Figure 2A:
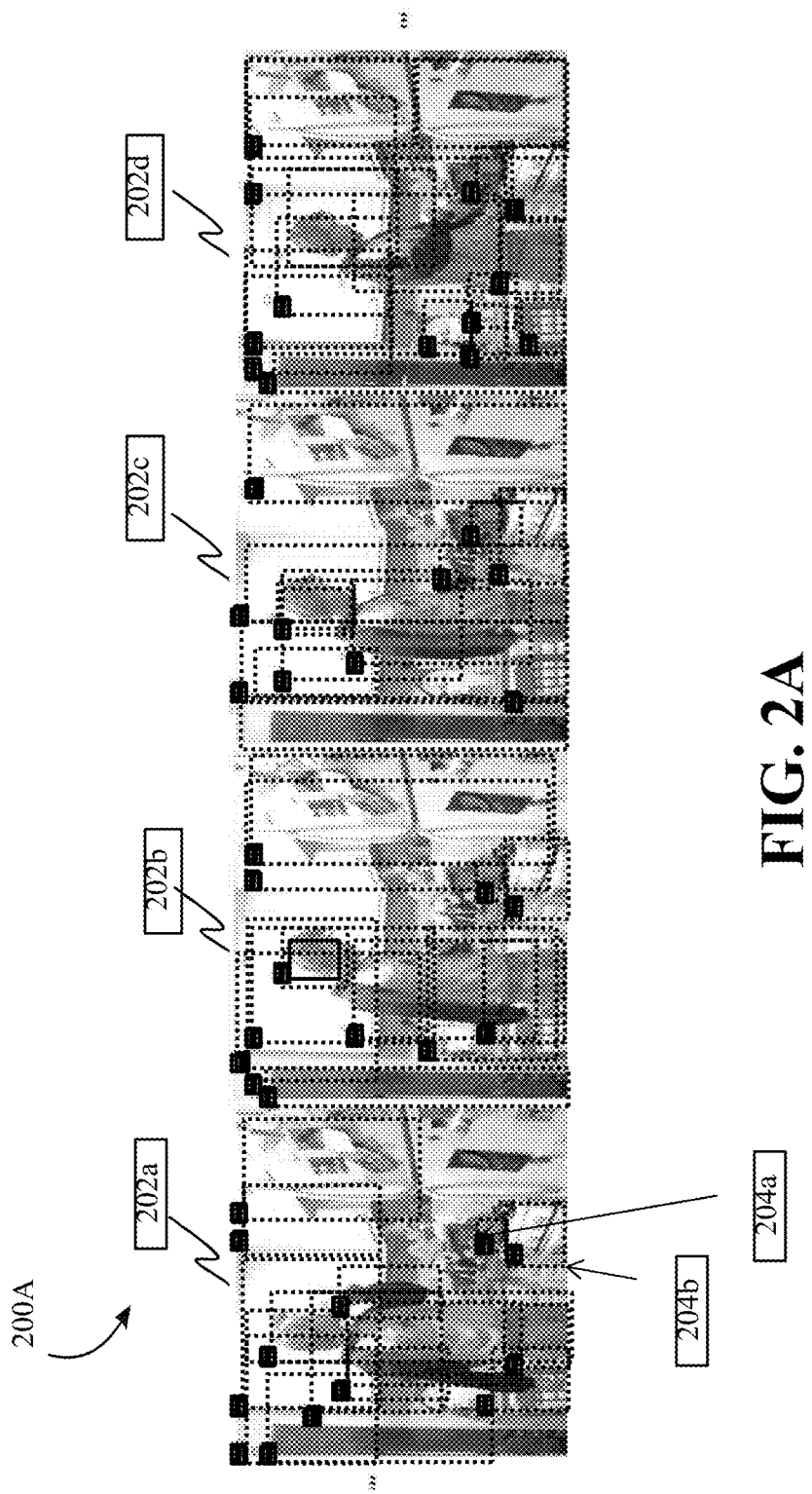
FIG. 2A shows a sequence of video frames of a video, according to some embodiments.

FIGS. 2A illustrates a sequence of video frames, such as a video frame 202a, a video frame 202b, a video frame 202c and a video frame 202d of a video 200A, according to some embodiments. In some embodiments, when the video 200A is provided to the AVSD system 100, the processor 104 detects key frames from the sequence of video frames 202a-202d. In some embodiments, the key frames are all frames of the sequence. In some embodiments, the processor 104 extracts the key frames using models trained on datasets. Additionally, or alternatively, some embodiments select key frames at equal temporal strides. Additionally, or alternatively, some embodiments select key frames via a temporal attention model. Additionally, or alternatively, in some other embodiments, the processor 104 extracts the key frames using key frame extraction techniques such as cluster-based key frame extraction, visual based key frame extraction, motion analysis based key frame extraction or the like. Based on the extraction of the key frames of the video 200A, the processor 104 is required to processes only the key frames instead of processing entire sequence of video frames (i.e. the sequence of video frames 202a-202d) of the video 200A. This improves computational speed and efficiency of the AVSD system 100.

In some embodiments, the processor 104 further detects and classifies objects in each video frame of the sequence of video frames 202a-202d. The audio-visual scene aware neural network 108 may include a set of instructions for object detection techniques such as a bounding box technique. The processor 104 may be configured to execute such instructions to detect the objects in each video frame. For instance, in video frame 202a, detected objects are indicated by bounding boxes, such as bounding box 204a and bounding box 204b. The detected objects are classified based on an object classifier of the audio-visual scene aware neural network 108. The object classifier may include a set of instructions to classify objects based on conventional object classification techniques. The processor 104 may be configured to execute the set of instructions of the object classifier in order to classify the objects in each video frame. The classified objects are labeled (not shown in FIG. 2A). For instance, the bounding box 204a is labeled pot and the bounding box 204b is labeled as stove. In a similar manner, objects in the remaining video frames of the sequence of video frames 202b-202d are detected and classified. Further, the processor 104 determines relationship among the classified objects to generate a scene graph representation for each video frame, i.e. the video frame 202a, the video 202b, the video frame 202c and the video frame 202d, which is further described in description of FIG. 2B. Alternatively, the processor 104 may detect and classify the objects from the key frames of the video 200A based on utilization of the audio-visual scene aware neural network 108 as described above.

Figure 2B:
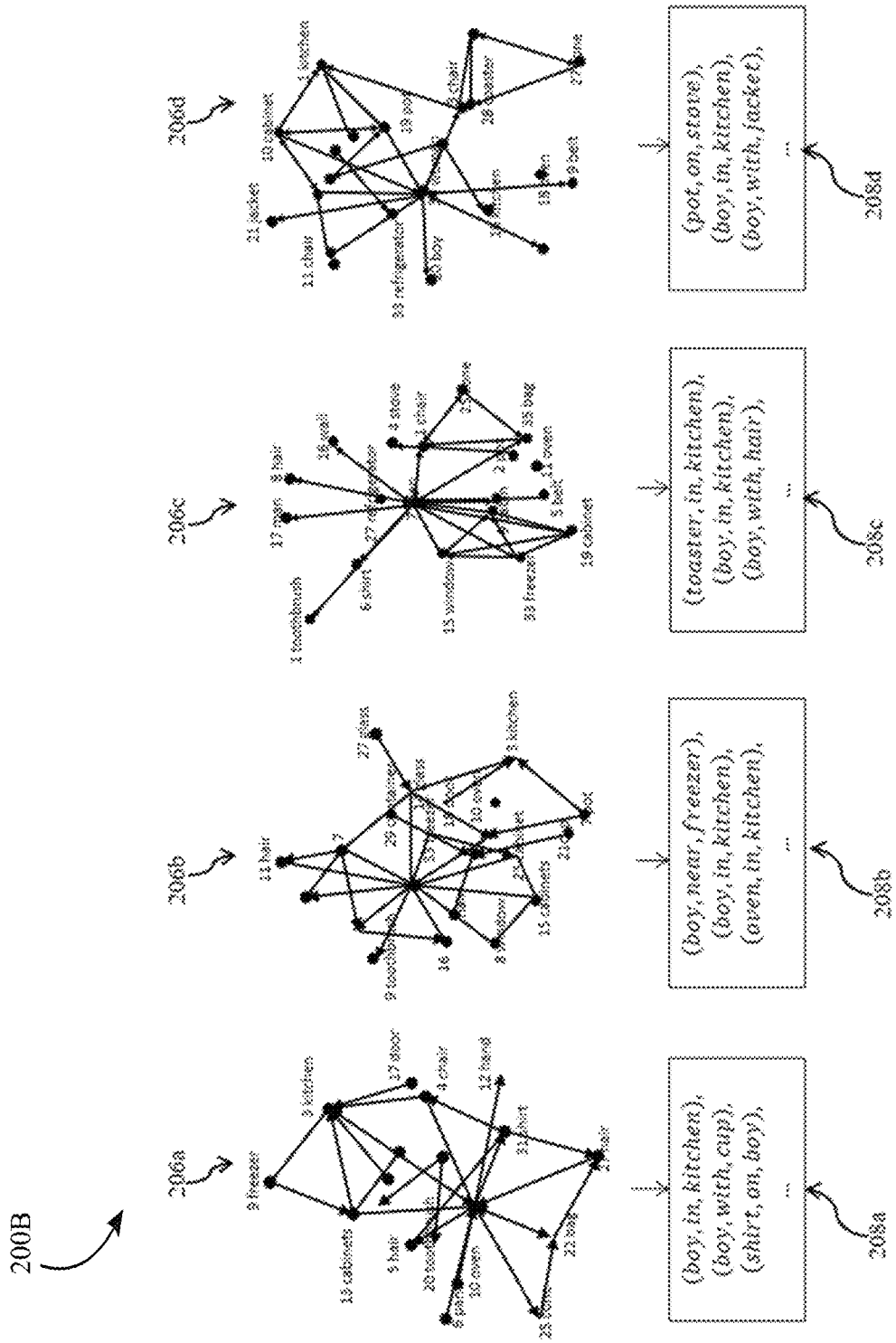
FIG. 2B shows a sequence of scene graph representations for the sequence of video frames, according to some embodiments.

FIG. 2B shows a sequence of scene graph representations 200B, according to some embodiments. The sequence of scene graph representations 200B includes a scene graph representation 206a, a scene graph representation 206b, a scene graph representation 206c and a scene graph representation 206d for the sequence of video frames 202a-202d. Further, the sequence of scene graph representations 206a-206d corresponds to a sequence of features 208a, features 208b, features 208c and features 208d of the classified objects and determined relationships. The processor 104 is configured to utilize the audio-visual scene aware neural network 108 to generate the sequence of scene graph representations as described in description of FIG. 1. Each scene graph representation of the sequence of scene graph representations 206a-206d represents the classified objects and the relationships among the objects in each video frame of the sequence of video frames 202a-202d. In the scene graph representation 206a, each node represents a classified object and each edge connecting two nodes represents the relationship among the classified objects. For instance, in the scene graph representation 206a, a subject node (e.g., 9 freezer) is directed to an object node (e.g., 13 cabinets). Further, the edge connecting the nodes is a directional edge such that the relationship among the objects is specified. The scene graph representation can be represented as, $G=\{(x_i, e_{ij}, x_j)|x_i, x_j \in V, e_{ij} \in \varepsilon\}$, where V is vertex set which consists of single objects, $\varepsilon$ is edge set which consists of relations linking two objects and $(x_i, e_{ij}, x_j)$ indicate that subject node $x_i$ and object node $x_j$ are connected by directed relation edge $e_{ij}$.

In some embodiments, the audio-visual scene aware neural network 108 includes a set of classifiers (also known as a set of neural network based classifiers), for extracting features of the objects based on visual features or semantic features of the objects in each video frame of the sequence of video frames 202a-202d. The set of classifiers include object classifier and a relationship classifier. The processor 104 is configured to select the object classifier and the relationship classifier from the set of neural network based classifiers based on the input sequence of video frames, the input contextual information, the input query or combination thereof. For instance, the video frame 202a denoted by I, the object features denoted by $F_I$, bounding boxes denoted by $B_I$, and semantics denoted by $S_I$ can be extracted by a neural network based object classifier, such as faster recurrent convolutional neural network (R-CNN) object detection model as $$F_I, B_I, S_I = \text{RCNN}(I) \qquad (1)$$

where $F_I \in R^{N_o \times d_o}$, $B_I \in R^{N_o \times 4}$, and $S_I$ is a list of semantic labels. In some implementation, the object detection model can detect $N_o=36$ detections, each detection is represented using a feature dimensionality $d_o=1024$, and use an object semantic label vocabulary size of 1601.

In a similar manner, the processor 104 selects the relationship classifier for determining relationships among the classified objects in each video frame of the sequence of video frames 202a-202d. The relationship classifier recognizes visual relations between the classified objects in the sequence of video frames 202a-202d. Further, the relationship classifier generates a fixed number of relation proposals, $N_r$, with highest confidences. For instance, $N_r$ is set to fixed number 100. In some implementations, the visual relations in each video frame (i.e., each of the video frames 202a-202d) are determined using relationship detection model that embeds objects and relations into vector spaces where both discriminative capability and semantic affinity are preserved. The relationship detection model is trained on a video dataset that contains 150 objects and 50 relationships indicated as predicates. When the relationship detection model is applied on the video frames 202a-202d, a set of subject S, predicate P and object O, i.e. <S, P, O> is obtained as output for each video frame. In one embodiment, the original predicate semantics P are discarded as relation predicates of the relationship detection model trained on the video dataset are limited and fixed. Thus, the relation proposals are based on <S, O> pairs that are used to learn implicit relation semantics of the objects. In most cases, the relation proposals $N_r$ may not include all objects that are unmentioned. The unmentioned objects are filtered out by conducting a graph pruning.

Further, the processor 104 integrates region of interests of objects in the sequence of video frames 202a-202d for determining relationships between two objects of the classified objects. More specifically, for the determined <S, O> pairs, a union box of bounding boxes (e.g., the bounding boxes 204a and 204b of FIG. 2A) for S and O is regarded as predicate region of interest that is used as an extra node in a new scene graph. The union box covering more information than both the subject and object bounding boxes captures higher-order interaction between each of the two objects.

Thus, the processor 104 extracts the sequence of sequence of features 208a-208d that includes features of both visual and semantic information using the feature extraction neural network 110. Further, the processor 104 uses the scene graph representations 206a-206d to extract visual memories of the video frames 202a-202d, which is described further in description of FIG. 2C.

Figure 2C:
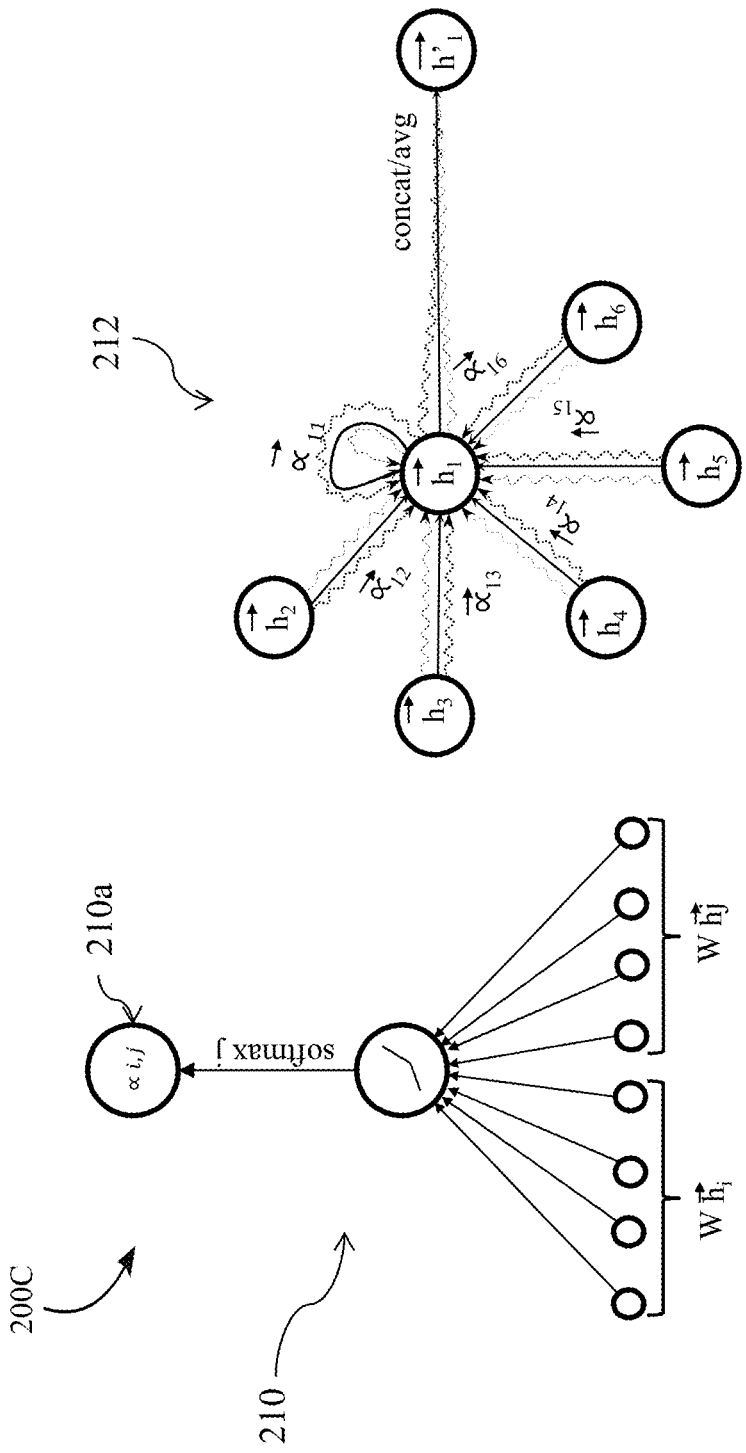
FIG. 2C shows a representation depicting a graph attention network and a relationship graph network generated for each frame according to some embodiments.

FIG. 2C shows a representation 200C depicting a graph attention network 210 and a relationship graph network 212 for representing 206a-206d forming a scene graph according to some embodiments.

In some embodiments, the processor 104 aggregates the classified objects and the determined relationships for generating visual memory for each video frame of the sequence of video frames 202a-202d. To that end, the processor 104 utilizes graph attention network 210 and the relationship graph network 212 that are stored in the memory 106. The graph attention network 210 includes a node 210a representing an attention coefficient value. Each scene graph representation of the sequence of scene graph representations 206a-206d is aggregated by performing intra-graph reasoning using the graph attention network 210 and the relationship graph network 212. The processor 104 utilizes the feature extraction neural network 110 of the AVSD system 100 to execute a frame-level intra-graph reasoning on the scene graph representations 206a-206d to extract visual graph memory or semantic graph memory for each video frame of the sequence of video frames 202a-202d.

The visual graph memory provides higher-level features that represent finer-grained information for each node (i.e. the object) in the scene graph representations 206a-206d. The higher-level features are extracted based on attention coefficient for each edge in each scene graph representation of the sequence of scene graph representations 206a-206d. The processor 104 determines the attention coefficient by the graph attention network 210. Further, the processor 104 aggregates the node features of the scene graph representations 206a-206d based on the attention coefficients. The processor 104 computes extra edge features based on the node features by the relationship graph network 212. Further, the processor 104 aggregates the extra edge features such that the relationship graph network 212 the node features are updated.

In the node-based feature aggregation, for M node features, $X=\{x_1, x_2, \ldots, x_M\}$ in a scene graph representation (e.g., the scene graph representation 206a-206d), self-attention is performed for each pair of linked nodes. For linked nodes $x_i$ and $x_j$, the attention coefficient 210a, $\alpha_{ij}$ which indicates importance of node j to node i is calculated by $$\alpha_{ij} = \frac{\exp(\Theta^T[Wx_i \| Wx_j])}{\sum_{k \in N_i} \exp(\Theta^T[Wx_i \| Wx_k])} \quad (2)$$

where $\|$ denotes vertical concatenation operation, $N_j$ indicates neighborhood object nodes of object i, $W \in R^{d_h \times d_{in}}$ is weight matrix of a shared linear transformation which transfers original features to higher level features, $\Theta \in R^{2d_h}$ is attention weight vector. The features of each object node in the scene graph representations 206a-206d are modified based on weighted sums of neighboring object features:

$$x'_i = \|_{k=1}^{K} \sigma(\Sigma_{j \in N_i} \alpha_{ij}^k W^k x_j) \quad (3)$$

where variables k and K define the number of heads in a multi-head attention scheme. The weighted sums of $x'_i$ is used as input for the relationship graph network 212 for performing edge-based feature aggregation. The relationship graph network 212 is a multi-layer fully connected network $h_\Lambda$ is employed to generate edge features $e_{ij}$ from two connected node features $(x'_i, x'_j)$:

$$e_{ij} = h_\Lambda(x'_i, x'_j) \quad (4)$$

where $h_\Lambda: R^{d_h} \times R^{d_h} \rightarrow R^{d_h}$ is a non-linear transformation with learnable parameters $\Lambda$. The output object feature $x^*_i$ is obtained by aggregating edge features that point to the object node:

$$x^*_i = \max_{j:(j,i) \in \varepsilon_i} e_{ij} \quad (5)$$

where $\varepsilon_i$ denotes set of edges pointing to node i. Thus, the processor 104 updates the node features inside the sequence of scene graph representations 206a-206d based on the graph attention network 210 and the relationship graph network 212. Further, to obtain the higher-level features for each node of the scene graph representations 206a-206d, the updated graph is pooled into the visual graph memory. In one implementation, the processor 104 is configured to execute the pooling of visual graph memory based on graph average pooling (GAP) and graph max pooling (GMP). The GAP and GMP are stored in the memory 106. The processor 104 accesses the GAP and GMP pooling and provides to the feature extraction neural network 110 for generating two graph streams that represent the visual graph memories. The visual graph memories such as visual graph memory 214a, visual graph memory 214b, visual graph memory 214c and visual graph memory 214d are described in FIG. 2D.

Figure 2D:
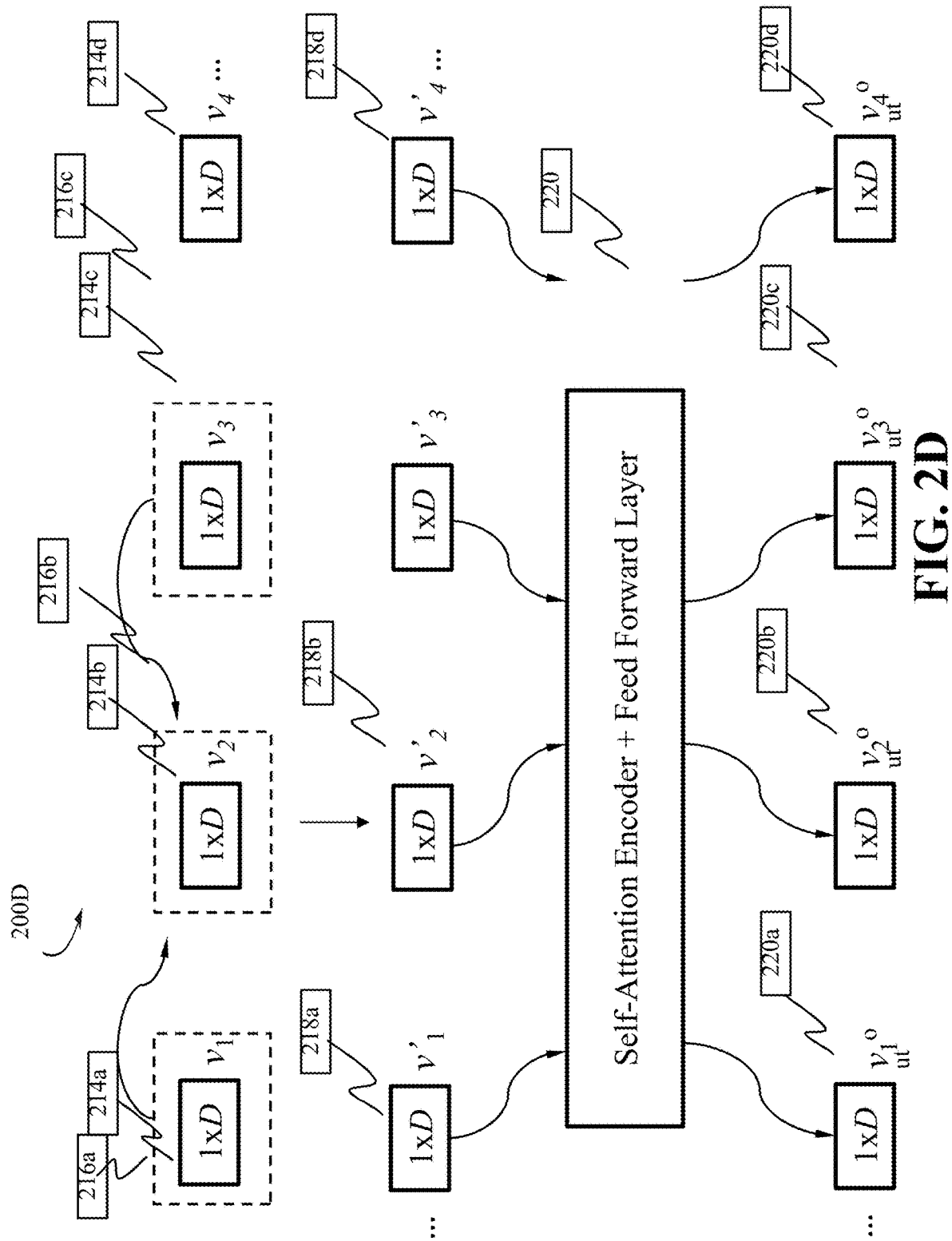
FIG. 2D shows a representation depicting a sequence of visual graph memories of the sequence of scene graph representations, according to some embodiments.

FIG. 2D shows a representation 200D depicting the sequence of visual graph memories, according to some embodiments. A sequence of visual graph memories 214a-214d includes such as the visual graph memory 214a, the visual graph memory 214b, the visual graph memory 214c and the visual graph memory 214d, which are concatenated as a final graph memory, $\upsilon \in R^{2d_h}$:

$$V^* = GAP(X^*, \in) \| GMP(X^*, \in) \quad (6)$$

where $\in$ denotes the connection structure of the scene graph representations 206a-206d, and $X^*$ the final node features $\{x^*_1, x^*_2, \ldots, x^*_M\}$.

For a sequence of scene graph memories (such as the scene graph memories 214a-214d) denoted by $\{\upsilon^*_1, \upsilon^*_2, \ldots, \upsilon^*_L\}$ of length L, windows 216a, 216b and 216c of size S are used to update the graph memory 214b of center video frame (such as the video frame 202b) in each window of the windows 216a-216c by aggregating graph memories 214a and 214c of neighboring video frames 202a and 202c in the window 216b. The processor 104 utilizes the aggregation neural network 112 for aggregating the graph memories 214a and 214c. The sequence of visual graph memories 214a-214d is set as $f \in R^{2d_h \times S}$ for performing self-attention over entire graph memories (such as the visual graph memories 214a-214d) within the window 214b. The processor 104 utilizes an attention-based neural network stored in the memory 106 for computing the self-attention value. The self-attention is computed by the attention-based neural network using a softmax function:

$$\alpha = \text{softmax}(P_\alpha^T \tanh(W_f f)) \quad (7)$$

where $W_t \in R^{2d_h \times 2d_h}$ is a weight matrix, $P_\alpha \in R^{2d_h}$ a weight vector and $\alpha \in R^S$ the attention weights of the video frame 202b (i.e. center video frame) on the video frames 202a-202c in the window 216b. The visual graph memory 214b $v_c$ is updated by aggregating information across the window 216b with the attention coefficient, $\alpha$:

$$v_c = \alpha \, f^T$$

The windows 216a-216c sliding over a visual graph memory (such as the graph memory 216b) of center video frame (e.g., the video frame 202b) of the sequence of video frames 202a-202d provides a sequence of final graph memories 2018a, 218b, 218c and 218d. The sequence of the final graph memories 218a-218d can be represented as V={$v_1$, $v_2$, ..., $v_L$}, which aggregates both the spatial information and the temporal information of the video frames 202a-202d. The final graph memories 218a-218d are provided as an input to a self-attention encoder and a feed forward network layer 220. The self-attention encoder and the feed forward network layer 220 extracts features represented as feature vectors 220a, 220b, 220c and 220d. The feature vectors 220a, 220b, 220c and 220d are submitted to a semantic-controlled transformer for generating a response to a query of the video 200A. The semantic-controlled transformer encodes contextual information, which is described further in FIG. 3.

Figure 3:
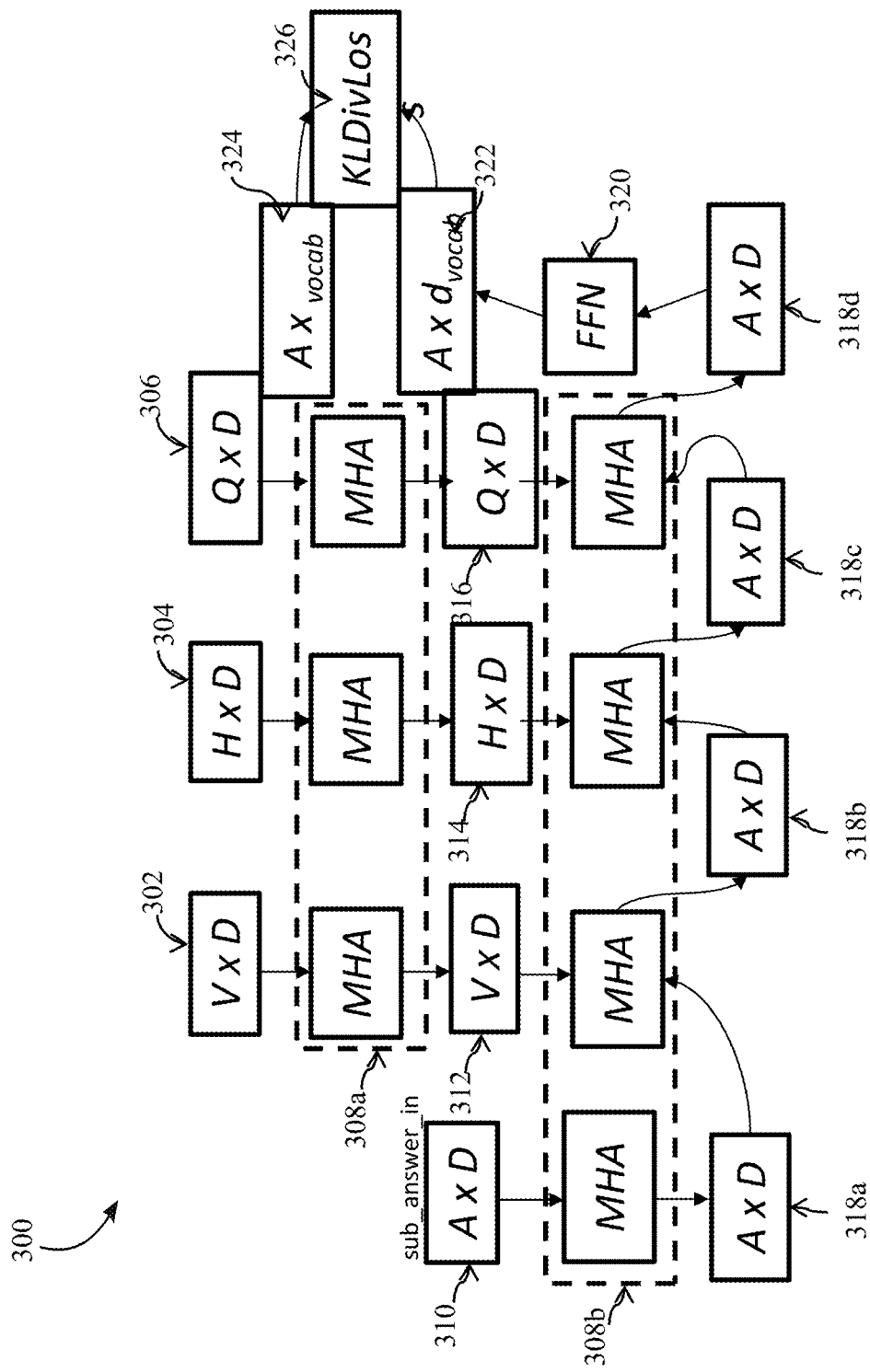
FIG. 3 shows a schematic diagram of a semantic-controlled transformer for generating a response to a query, according to some embodiments.

FIG. 3 shows a schematic diagram of a semantic-controlled transformer 300 for generating a response to a query, according to some embodiments. The semantic-controlled transformer 300 includes two-layers of multi-head attention (MHA) network layer, such as MHA network layer 308a and MHA network layer 308b. In some embodiments, the memory 106 may be configured to store the sematic-controlled transformer, where the sematic-controlled transformer 300 may include a set of instructions to encode contextual information of the feature vectors 220a, 220b, 220c, and 220d for generating a response to a query. In order to execute the semantic-controlled transformer 300, the processor 104 obtains the feature vector 302, contextual information 304, and query 306 as input. The feature vector 302 corresponds to the sequence of feature vectors 220a-220d and is represented as (V×D), where D is feature dimension. The contextual information 304 corresponds to history of video question answering (H×D). The query 306 corresponds to questions of the video 200A represented as (Q×D).

In particular, the feature vector 302, the contextual information 304 and the query 306 are provided as the input to the MHA network layer 308a. The MHA network layer 308a encodes text information based on the contextual information 304 and learns a dialog model for generating a response to the query 306. Further, the MHA network layer 308a generates an encoded feature vector 312, encoded contextual information 314 and an encoded query 316. The encoded feature vector 312, the encoded contextual information 314, the encoded query 316 and features of a sub answer 310 (A×D) are provided as input to another MHA network layer 308b to generate a response for the query 306. The response includes feature vector 318a, feature vector 318b, feature vector 318c and feature vector 318d generated by shuffling head vectors of the reference answer 310, the encoded feature vector 312, the encoded contextual information 314 and the encoded query 316, respectively. The shuffling of the head vectors improves performance of the semantic-controlled transformer 300 as hidden features are also extracted. The response is generated in an iterative manner, as shown in FIG. 3. For example, the answer is generated one word at a time, and the part of the answer generated so far is encoded and passed as input to generate the next word to form the reference answer 324.

The head vectors of the feature vectors 318a-318d are shuffled before feeding into feed-forward network (FFN) module 320 that are later concatenated. The FFN module 320 includes two fully connected layers with a ReLI function in between. The concatenation fuses the features of the contextual information 304 and the visual features of the feature vector 302 to extract a feature vector 322. A loss function (L) 326 is implemented between a predicted probability distribution P of the feature vector 322 and a ground token distribution G of features 324 of reference answers. In one embodiment, the loss function 326 is based on Kullback-Leibler divergence:

$$L = KLDiv(P \mid G) = \sum_{j=1}^{N_t} P(j) \ln \frac{P(j)}{G(j)} \qquad (13)$$

In each iteration, one word is generated and next word for the response is predicted using a co-attention transformer of the semantic-controlled transformer 300. Further, all next token probability distributions are collected in a batch to obtain the predicted probability distribution P. In a similar manner, ground token distribution G is obtained from ground truth answers or responses to the query 306.

Thus, the semantic-controlled transformer 300 learns the dialog model and generates the responses to the query 306.

Figure 4:
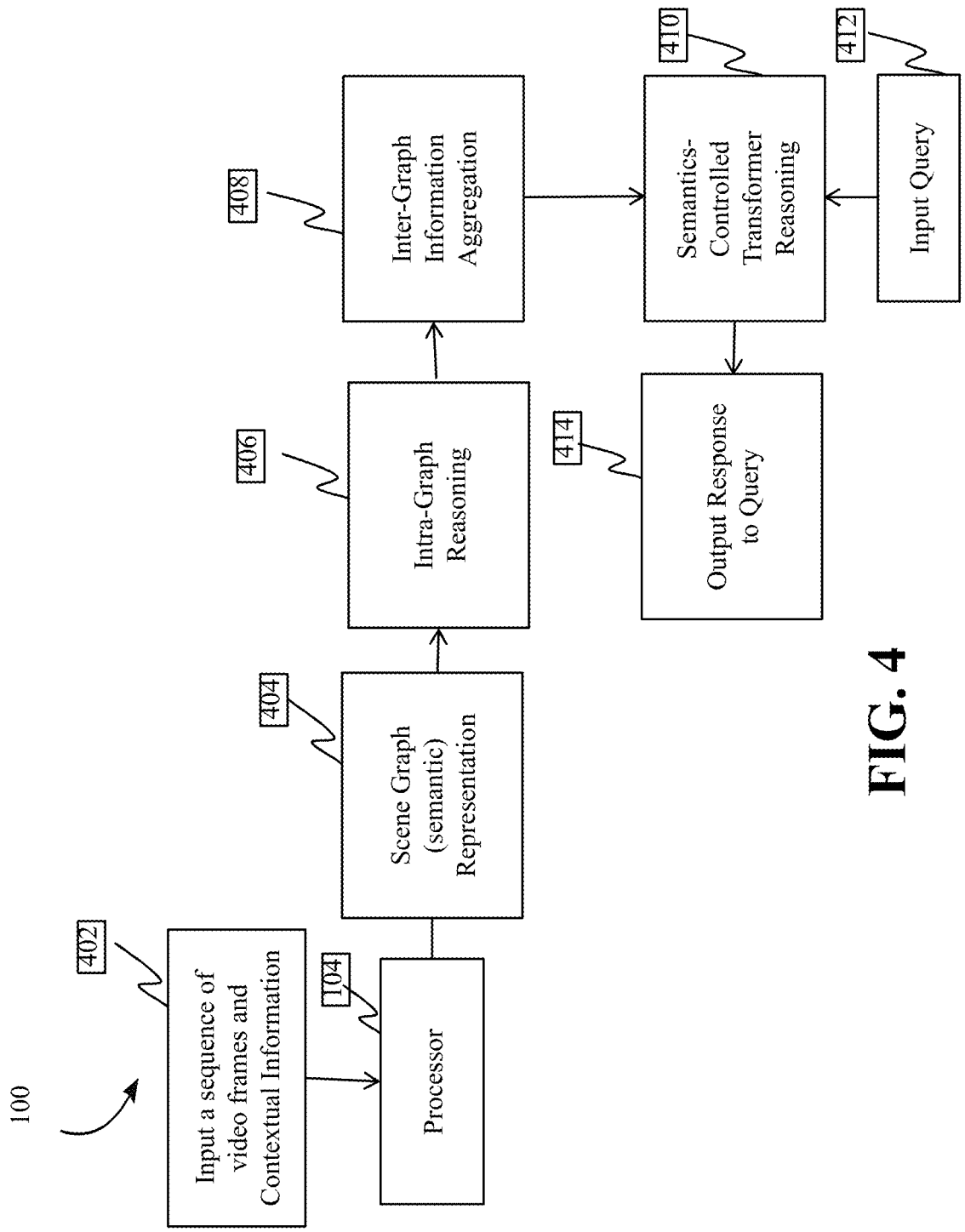
FIG. 4 shows a schematic overview of principles of the AVSD system for generating a response to a query, according to some embodiments.

FIG. 4 shows a schematic overview 400 of principles of the AVSD system 100, according to some embodiments. The AVSD system 100 receives an input sequence of video frames and contextual information 304. The processor 104 generates scene graph representation 404 for the sequence of video frames 202a-202d. The scene graph representation 404 corresponds to the scene graph representations 206a-206d as described in description of FIG. 2B. The scene graph representation 404 is a semantic representation of a scene in a frame. From the scene graph representation 404, visual graph memories (e.g., the visual graph memories 214a-214d) are generated by intra-graph reasoning 306, as described in description of FIG. 2C. The processor 104 utilizes the visual graph memories 214a-214d for inter-graph information aggregation 408 to generate final graph memories, i.e. the graph memories 218a-218d. The final graph memories 218a-218d are provided as an input for the semantic-controlled transformer 300. Further, the processor 104 is configured to execute the semantic-controlled transformer reasoning 410, to encode the final graph memories 218a-218d, the contextual information 304 and the input query 412 to generate the output response 414. In some embodiments, the input query 412 is provided to the semantic-controlled transformer 300 to execute the semantics-controlled transformer reasoning 410.

Typically, in language modelling, words for the answer sentences are predicted from a vocabulary repository. In one implementation, prediction of next word for a word in an answer sentence is performed based on the input query 412. The contextual information 304 includes source sentences, such as video caption, dialog history and the reference answer 310 (i.e., an already generated answer). For instance, dialog history, H={C, ($Q_1$, $A_1$), ..., ($Q_{l-1}$, $A_{l-1}$)}, where C is the video caption, $Q_l$ i is the query and $A_l^m$ is the reference answer. The semantics-controlled transformer reasoning 410 generates probability distribution of next token of a word for all tokens of words in the vocabulary for the output response 414. The reasoning process of the semantics-controlled transformer reasoning 410 is controlled based on concatenated visual graph memories 214a-214d and final graph memories 218a-218d.

In the semantics-controlled transformer reasoning 410, the sentence sources that include the dialog history (H), the video caption (C), the query ($Q_l$) and the reference answer ($A_l^{in}$) are embedded together using tokenization and word positional embedding layer. For instance, text sources (H, C, $Q_l$, $A_l^{in}$) is tokenized as $e_h, e_c, e_q, e_a$. In one implementation, a text source is tokenized by byte-pair encoding (BPE). The tokenized text source is transformed into a representation of LW dimensional vectors that correspond to a sentence length (L) and a word embedding dimension (W), by the word positional embedding layer. Each word of the tokenized text source is encoded into a position embedding space and added to the word embedding layer. In a similar manner, a target sentence is encoded into a position embedding space. A continuous representation $S \in R^{L \times C}$ of the text source at the input of a self-attention module is translated into key (k), query (q) and value (v) using linear transforms. The self-attention module computes an attention value between the key and the query. The attention value between the key and query enable each word in the text source to aggregate information from other words using the self-attention module.

Further, the visual graph memories (i.e., the visual graph memories 214c-214d) of dimension $2d_h$ are transferred to $d_h$ dimension features, $e_v$ that match LW dimension of the text sources. Next, the tokenized reference answer (i.e., the reference answer 310) $e_a$ is encoded using a self-attention based mutli-head shuffling transformer (i.e., the MHA network layer 308a) to generate encoded hidden representations ($h_{enc}$).

$$h_{enc} = FFN(\text{Attention}(W_q e_a, W_k e_a, W_v e_a)), \quad (9)$$

where $W_q$, $W_k$, $W_v$ are weight matrices for the query (q), key (k) and value (v), respectively. FFN is a feed-forward network module that includes two fully-connected layers with an activation function (i.e., rectified linear unit (ReLu)) in between. The encoded hidden representations correspond to the feature vectors 318a-318d.

The attention coefficient between the key (k) and the query (q) with the value (v) is determined based on attention function defined as:

$$\text{Attention}(q, k, v) = \text{softmax}\left(\frac{qk^t}{\sqrt{d_h}}\right)v \quad (10)$$

where, $\sqrt{d_h}$ is a scaling factor for maintaining scalars in order of magnitude and $d_h$ is dimension of each head in the feature vectors (i.e., the encoded feature vector 312, the encoded contextual information 314 and the encoded query 316).

After encoding the input query 412, co-attention for each of the other word and visual embedding $e_j$ is performed, where $j \in \{h, c, q, v\}$, with the same transformer structure of the multi-head shuffling transformer (i.e., the MHA network layer 308b):

$$h'_{enc,j} = FFN(\text{Attention}(W_q h_{enc}, W_k e_j, W_v e_j)), \quad (11)$$

where, $h'_{enc,j}$ is a new encoded feature.

By concatenating features of the sentence sources and the visual features (i.e., the feature vectors 318a-318d), a feature vector $h^*_{enc,j}$ is extracted. Each head vector in each sentence source feature (i.e., the encoded contextual information 314 and the encoded query 316) and each visual feature (i.e., the encoded feature vector 312) are shuffled by the multi-head shuffling transformer (i.e., the MHA network layer 308b). The multi-head shuffling enable head vectors of the encoded feature vectors 312, the encoded contextual information 314 and the encoded query 316 to interact from start to end, which improves performance of the semantic-controlled transformer reasoning 410. The head vectors are shuffled before feeding into two fully connected layers of the FFN module 320 that are later concatenated. The concatenation fuses the features of the text sources and the visual features to extract final encoded feature vector $h^*_{enc,j}$. The feature vector $h^*_{enc,j}$ is used for predicting next token probability distribution ($p_{vocab}$) over the tokens in the vocabulary. The next token probability distribution ($p_{vocab}$) is predicted using a FFN with softmax function:

$$(p_{vocab}) = \text{softmax}(FFN(h^*_{enc})) \quad (12)$$

VIn testing stage, beam search with b beams is conducted to generate an answer sentence. In each step, b tokens with the top-b highest confidence scores are selected. The answer is completed either when token end of sentence, <eos> is generated or when maximum number of tokens is reached. Accordingly, the processor outputs the output response 414 to the input query 412 based on the generated answer.

Figure 5:
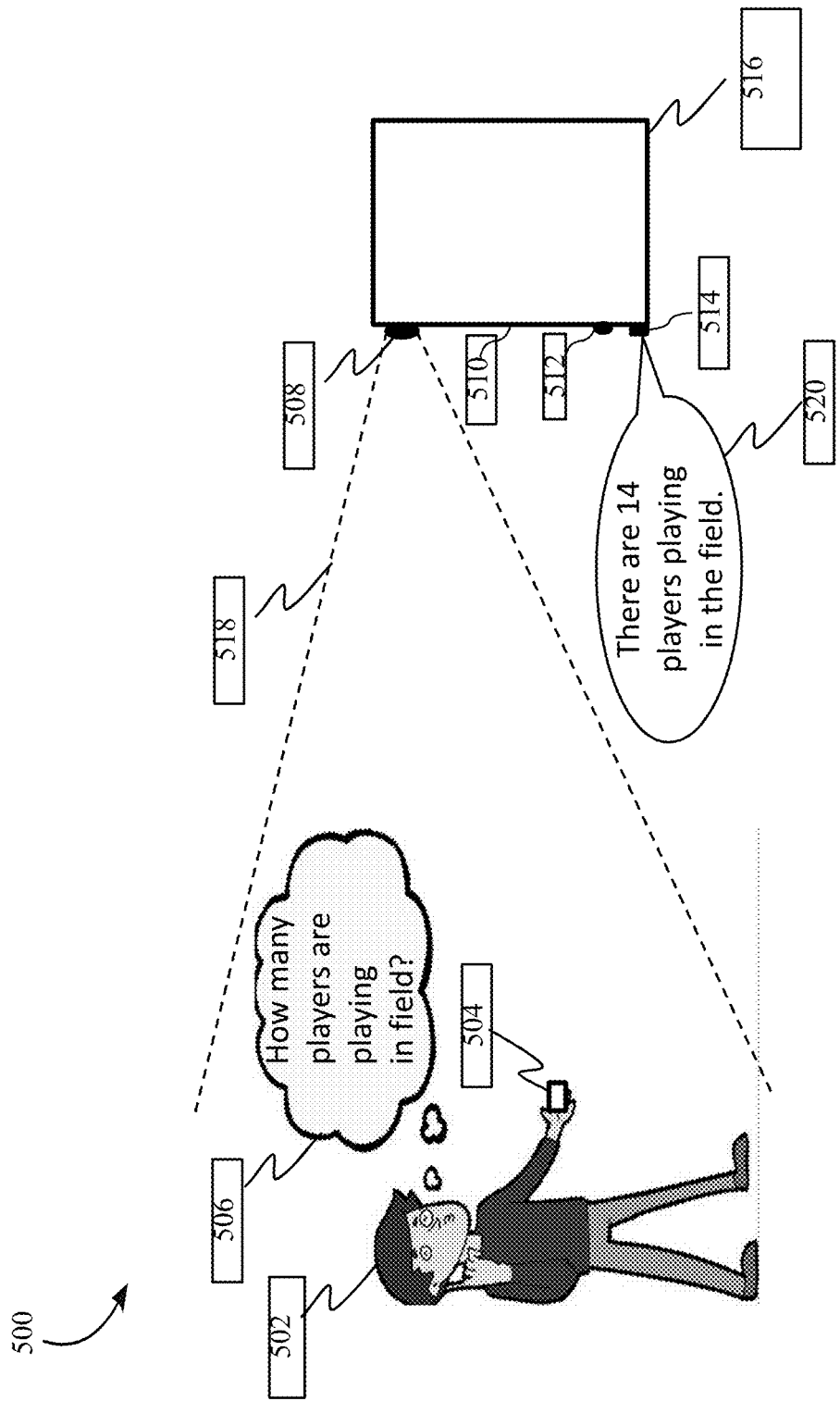
FIG. 5 illustrates an example scenario for generating a response to a query using a device implemented with the AVSD system, according to one example embodiment.

FIG. 5 illustrates an example scenario 500 for generating a response 520 to a query 506 using a device 516 implemented with the AVSD system 100, according to one example embodiment. The device 516 can be a television, a laptop, a computer, a smartphone or any display device. In some embodiments, the device 516 is embedded with the AVSD system 100 and is configured to process and generate a response to a query 506 from the user 502. In such cases, the AVSD system 100 in the device 516 generates the response relevant to the query 506 by encoding multi-modal information, such as contextual information like video caption of the video, video dialog history of the video and audio of the video. The multi-modal information is encoded to visual and semantic information of the video, as described in FIG. 3. The visual and scene information are extracted by the processor 104 of the AVSD system 100, which are described in FIGS. 2A and 2B.

In an alternate embodiment, the AVSD system 100 may be remotely coupled with the device 516 through an online connection link of a network, such as the network 124. Further, the user 502 is associated with an electronic device 504 that is capable of communicating with the device 516. The electronic device 504 may communicate with the device 516 via communication links, such as Bluetooth connection, infra-red connection, Wi-Fi connection, or the like. In an alternate embodiment, the AVSD system 100 may be coupled to the device 516 via a cloud network (not shown in FIG. 5).

Further, the device 516 may include one or more components such as a camera 508, a display screen 510, a microphone 512 a speaker 514, and the like. The camera 508 captures the user 502 that is in field of view 518 of the camera 508. Additionally or alternatively, the camera 508 captures gestures of the user 502, such as hand gestures pointing to an object in a video. Accordingly, the device 516 transmits the query 506 along with the gestures to the AVSD system 100.

For instance, the user 502 is watching a sports match displayed on the display screen 510 of the device 516 and the user 502 provides a query 506 for the sports match via the electronic device 504. The query 506 may be "how many players are playing in the field?". The user 502 may provide the query 506 along with a hand gesture pointing to the sports match. The query 506 is captured by the electronic device 504 enable the system 100 to determine what the user 502 is asking about. The electronic device 504 transmits the query 506 to the device 516. Alternatively, the user 502 may provide the query 506 via the microphone 512 of the device 516. The microphone 512 receives the query 506 and provides to the AVSD system 100 in the device 516. The AVSD system 100 processes the sports match video, the input query 506 and contextual information of the sports match stored in the storage device 114 to generate a response 520 to the query 506 as described above in description of FIGS. 2A to 2D, FIG. 3, and FIG. 4. Accordingly, the device 516 outputs the generated response 520 via the speaker, where the response 520 may be "there are 14 players playing in the field". Accordingly, the device 516 implemented with the AVSD system 100 facilitates response (e.g., 520) to a query (e.g., 506) to a user (e.g., 502).

FIG. 6 shows an exemplary representation of a table 600 including information of a sequence of video frames, contextual information 402 and the input query 412, according to some embodiments. The table 600 includes columns, such as video 602, video caption 604, dialog history 606, query 608, answer 610, and generated answers 612. The table 600 includes rows 614 and 616 that indicate the information corresponding to the video, the contextual information and the query. The column of video 602 indicates video files containing sequence of video frames (e.g., the video frames 202a-202d) of a video 200A. The video files can be stored in video file formats, such as flash (.flv or .swf), .mp4, audio-video interleave (.avi) or the like. The column of video caption 604 indicates information of video captions or subtitles of corresponding video files. In some embodiments, the captions could from a video captioning system, that generates brief descriptions of entire videos. The column of dialog history 606 indicates history of video question answering dialogs. In some implementations, the table 600 is stored in the storage device 114 of the AVSD system 100. For instance, when an input query, such as the input query 412 is received by the AVSD system 100, the input query 412 is stored in the table 600 the storage device 144 in the column of query 608. Further, the processor 104 of the AVSD system 100 extracts feature vectors using the information of the video 602, video caption 604, and dialog history 606 for generating the output response 314. In one embodiment. The output response 314 is generated based on a reference answer and generated answer sentences corresponding to the column of the reference answer 610 and generated answers 612, respectively. Another embodiment does not use reference answer to generate the answer. The reference answer is only used during training.

Further, at row 614, under the column of generated answers 612, one or more answers to an input query, are generated. Each generated answers in the generated answers 612 is associated with a confidence score. The generated answer with the highest confidence score is selected as an output response (e.g. the output response 314 as described in description of FIG. 3). In a similar manner, at row 616 corresponding to the generated answers 612, the answer with the highest confidence score is generated as the output response. The videos, i.e. Video-1 and Video-2 under the column of video 602, are described further in FIG. 7A and FIG. 7B.

Figure 7A:
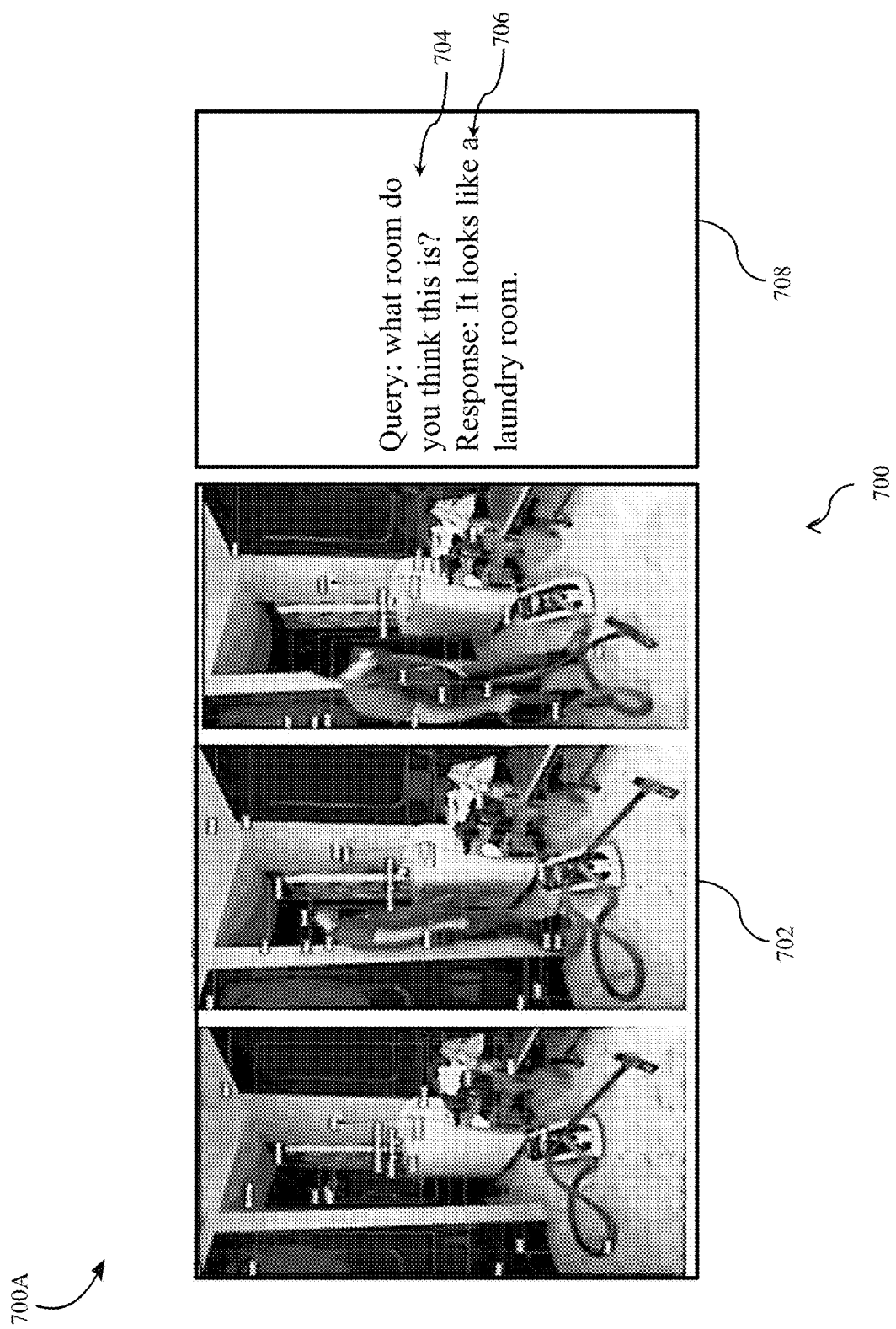
FIG. 7A shows an exemplary scenario for generating response to an input query, according to one example embodiment.

FIG. 7A is an example scenario 700 for generating a response 706 to an input query 704 for a video, according to one example embodiment. The representation 700 depicts a video (e.g., Video-1 of FIG. 6) with a sequence of video frames, collectively referred to as video frames 702. The video is played in a device, such as the device 516. For instance, the video shows a man in a room that comprises objects such as a vacuum cleaner, clothes, table, a washing machine, and the like. When the query 704 is provided to the AVSD system 100, such as "what room do you think this is?", a response 708 based on the received query 704 is generated.

To that end, the AVSD system 100 includes the processor 104 that processes the video frames 702 and extracts visual and semantic information from the video frames 702. Further, the processor 104 encodes the visual and semantic information with contextual information, such as video caption of the video frame 702, video dialog history and audio of the video frame 702 for generating the response 708. The response 708 is generated based on a generated answer with the highest confidence score in the generated answers 612 as described in description of FIG. 6. For instance, the response 708 to the query 704 may be "it looks like a laundry room".

Figure 7B:
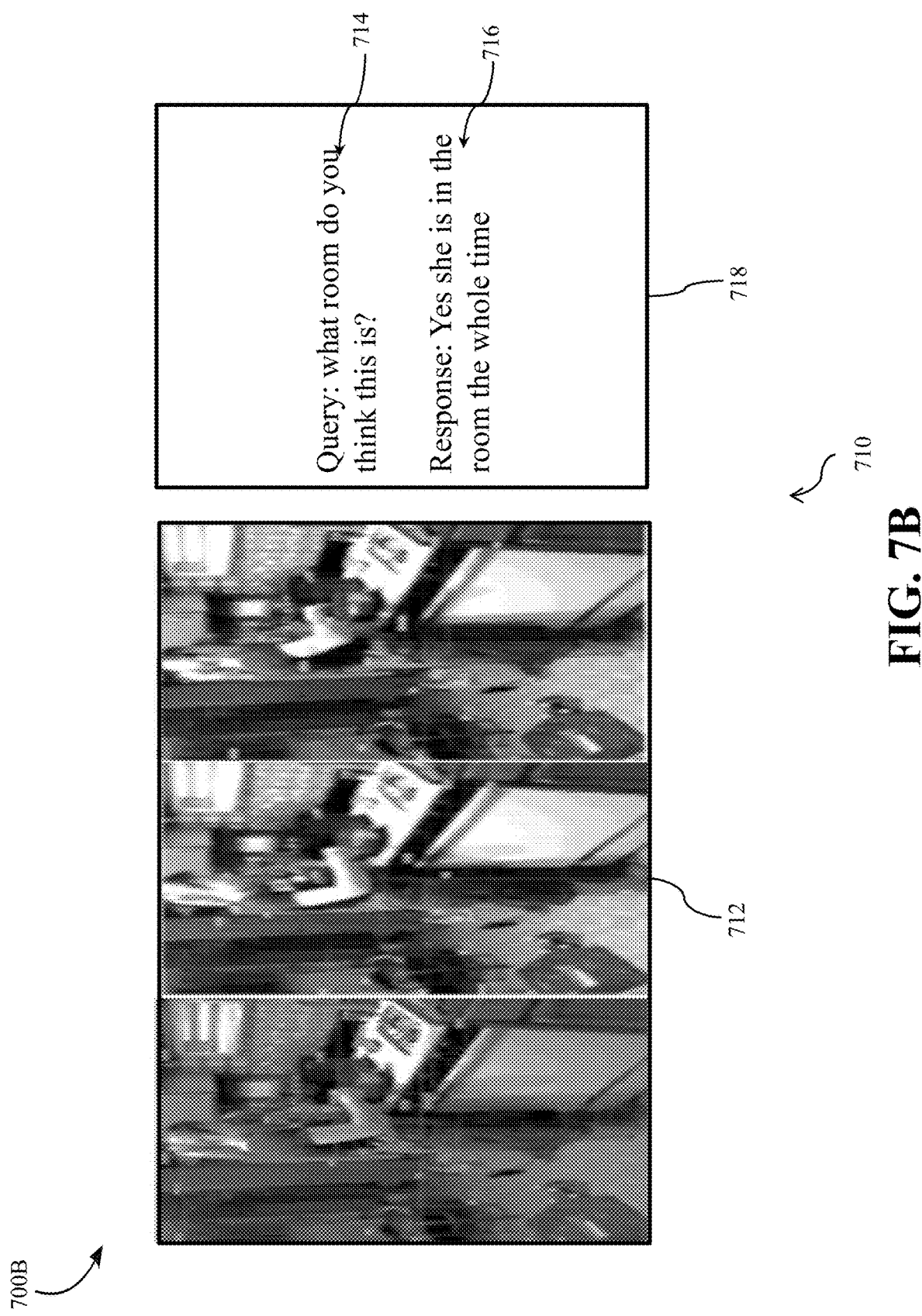
FIG. 7B shows an exemplary scenario for generating response to an input query, according to another example embodiment

FIG. 7B is an example scenario 710 showing a response 716 to an input query 714 for a video, according to another example embodiment. The user 502 is watching the video in the device 516. The video corresponds to Video-2 of FIG. 6 with a sequence of video frames, collectively referred to as video frames 712. The user 502 provides the query 714 via speech or text format. The AVSD system 100 in the device 516 includes the processor 104 that processes the video frames 712 for extracting visual and semantic features of the video frames 712. The visual and semantic features are further encoded with multi-modal input data i.e., video caption, video dialog, and audio (or contextual information) to generate a relevant response to the query 714. The relevant response, such as response 716 is generated for the query 714. The response 716 corresponds to generated answer with the highest confidence score, as shown in the table 600 of FIG. 6.

Figure 7C:
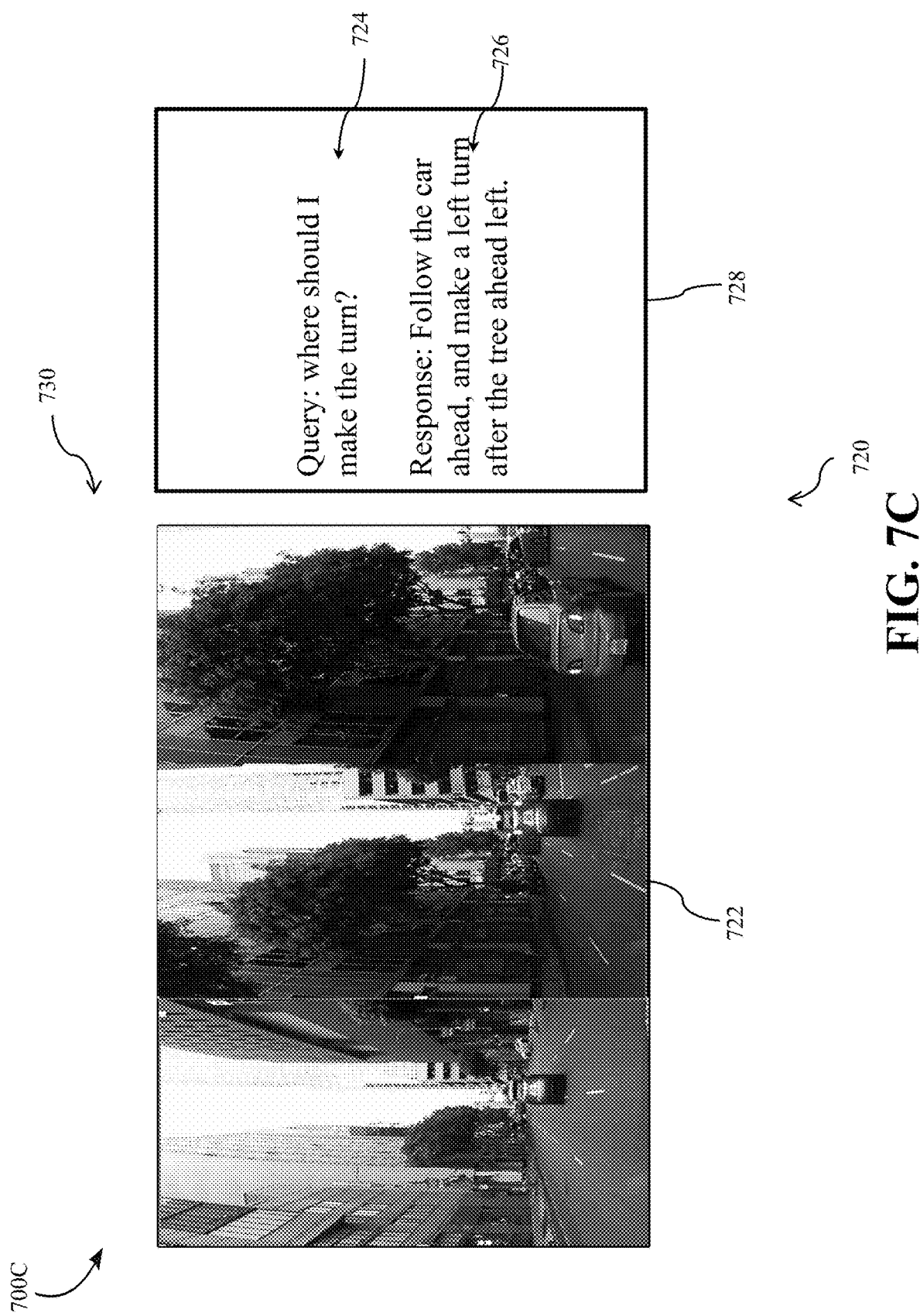
FIG. 7C shows an exemplary scenario for generating response to an input query, according to another example embodiment.

FIG. 7C is an example scenario 720 showing a response 726 to an input query 724 for a video, according to another example embodiment. The user 502 is driving a vehicle and a camera, e.g., a dashboard camera, captures the video of the dynamic scene 712 in front of the vehicle. In this embodiment, the user 502 can make a navigation query 724 for navigating the vehicle to a pre-defined destination 730. The user 502 provides the query 724 via speech. In another embodiment, the query could be gathered from a pre-computed navigation route for the destination 730. The AVSD system 100 in the device 516 includes the processor 104 that processes the video frames 722 for extracting visual and semantic features of the video frames 722. The visual and semantic features are further encoded with multi-modal input data i.e., video dialog, and audio (or contextual information such as GPS coordinates, depth maps, and the like) to generate a relevant response to the query 724. The relevant response, such as response 726 is generated for the query 724.

In this embodiment, the AVSD system 100 can use an object and a relationship classifiers configured to detect and classify objects and their relationship relevant for generating navigation instructions. For example, the objects can include buildings, cars, pedestrians, poles, traffic lights or any other object relevant to a driver. Examples of relationships can include ahead, behind, on the right, on the left, etc. In this embodiment, the AVSD system 100 is configured to generate a navigation instruction using description of classified objects and their relationship with navigation route for the destination. For example, the AVSD system 100 can generate a navigation instruction such as "follow the car ahead, and make a left turn after the tree ahead left." In this example, the classified objects are car and a tree. Their relationships with the navigated vehicle indicate that both the car and the tree are ahead of the vehicle. Their relationships with the navigation route for the destination indicate that there is a need to turn left to follow the navigation route.

This embodiment is based on recognition that there is a need to provide route guidance to a driver of a vehicle based on real-time unimodal or multimodal information about static and dynamic objects in the vicinity of the vehicle. For example, it is an object of some embodiments to provide context based driving instruction like "turn right before the brown brick building" or "follow the white car" in addition to or in alternative to GPS based instructions like "in 100 feet take the second right onto Johnson street." Such context based driving instructions can be generated based on real-time awareness of a scene in proximity of the vehicle. To that end, the context based navigation is referred herein as a scene-aware navigation that can be implemented using a dialog system according to the various embodiments.

Figure 8:
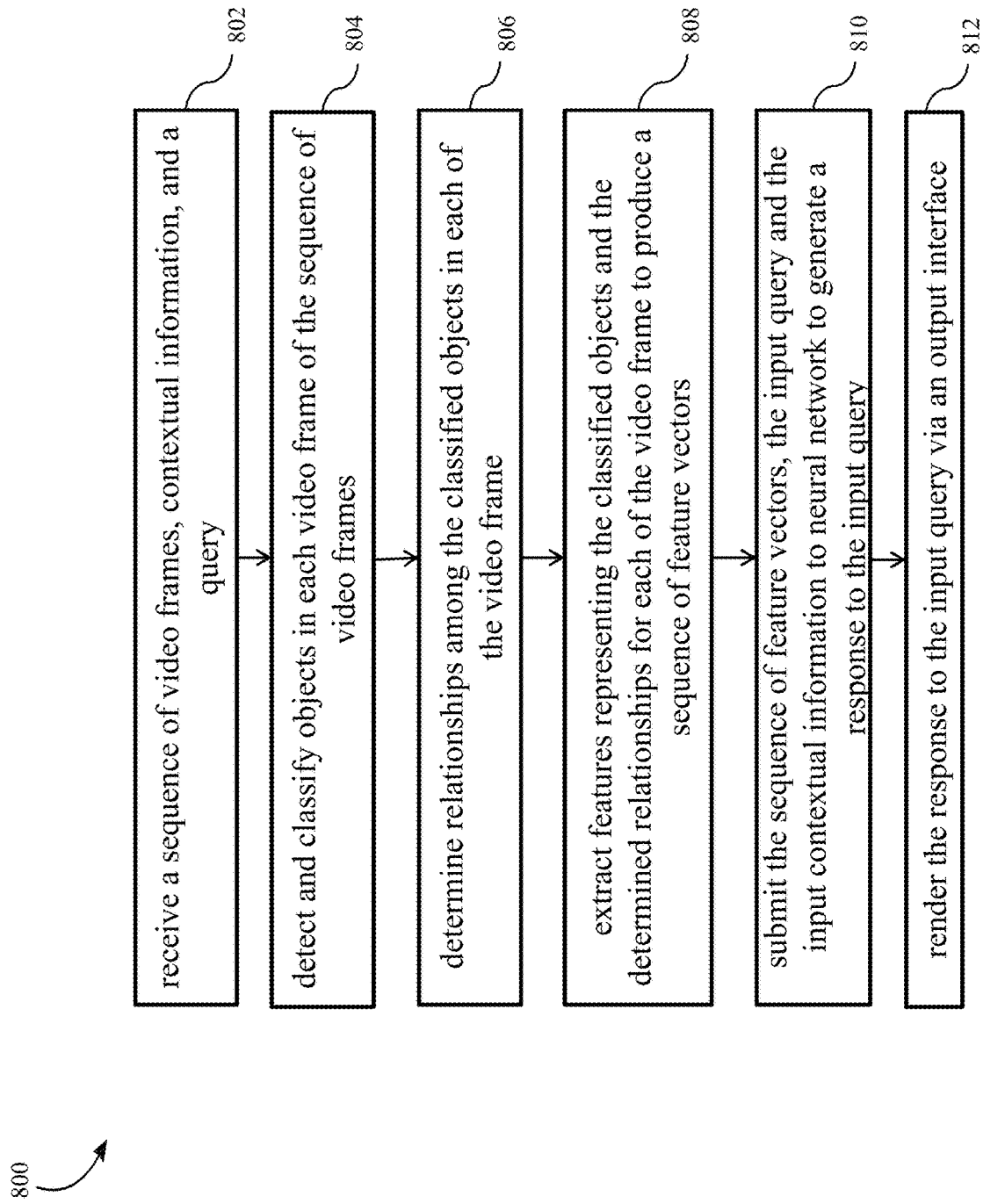
FIG. 8 shows a method flow diagram for generating a response to a query by the AVSD system, according to some embodiments.

FIG. 8 shows a method flow diagram 800 for generating a response to an input query by the AVSD system 100, according to some embodiments. At block 802, the system 100 receives a sequence of video frames, contextual information and a query. The sequence of video frames corresponds to the sequence of video frames (e.g., the sequence of video frames 702 or 712 of FIGS. 7A and 7B). The contextual information includes video caption 604, dialog history 606 and reference answer 608 as described in FIG. 6. The query corresponds to the input query 704 or 706 of FIG. 7. At block 804, the system 100 detects and classifies objects in each video frame of the sequence of video frames 202a-202d. At block 806, the system 100 determines relationships among the classified objects in each of the video frame of the sequence of the video frames 202a-202d. Each video frame includes at least two classified objects and relationship between the two classified objects is an intra-frame object relationship confined within the video frame.

At block 808, the system extracts features representing the classified objects and the determined relationships for each of the video frame to produce a sequence of feature vectors (i.e., the sequence of feature vectors 418a-418d of FIG. 4). Each video frame of the sequence of video frames 202a-202d has one feature vector (i.e., the feature $h^*_{enc}$) encoding information or features of text and visual sources. At block 810, the system 100 submits the sequence of feature vectors 418a-418d, the input query 412 and the input contextual information to neural network (i.e., semantics-controlled transformer reasoning 310) to generate a response (i.e., the output response 314) to the input query 412. At block 812, the system 100 renders the response 314 to the input query 412 via an output interface, such as the output interface 116.

FIG. 9 shows a table 900 depicting ablation analysis on components of the system 100, according to some embodiments. The ablation analysis demonstrates effectiveness of the AVSD system 100 regarding the use of shuffle in transformer structure, whether to use graph attention network or relationship graph network, whether to conduct region of interest (ROI) recropping for union bounding boxes, whether to use both visual and semantic graphs, whether to perform temporal information aggregation, or the like. The ablation analysis is studied using conventional evaluation metrics, such as BLUE-1, BLUE-2, BLUE-3, BLUE-4, METEOR, ROUGE L and CIDEr. The different components correspond to shuffle in transformer structure, graph neural network types, union bounding box, semantic labels, and temporal information aggregation of the AVSD system 100.

As shown in FIG. 9, the table 900 depicts ablation studies, such as full model, without (w/o) shuffle, w/o graph attention network (GAT), w/o relationship graph network (e.g., EdgeConv), w/o union box feature, w/o semantic graph and w/o temporal information. The full model uses shuffle in the transformer structure, the graph attention network, the relationship graph network, the union bounding boxes, both the visual and semantic graphs and the temporal information aggregation. In row 902, the full model has higher precision values when all the key components are used. For instance, Graph Attention Network is very useful to aggregate information from neighborhood nodes while the relationship graph network, i.e. EdgeConv can offer small improvement on the basis of Graph Attention Network. Moreover, the use of shuffle in multi-head transformer structure (MHA network layers 308a and 308b of FIG. 3) boosts the performance of the AVSD system 100. Further, the union bounding boxes, the semantic labels, and the temporal information aggregation contribute to stabilize performance of the feature vector extraction for generating the response. Overall, by adopting these components, the full model outperforms all the ablations.

FIG. 10A is a table 1000A depicting comparison of the AVSD system 100 with baseline methods on test split of AVSD challenge at Dialog System Technology Challenge 7 (DSTC7), according to some embodiments. In the table 1000, quantitative results on DSTC7 test split are shown. The results demonstrate that the AVSD system 100 achieves better performance than the other methods even without audio features, such as VGGish audio features or a 3-dimensional (3D) convolutional neural network (CNN) (such as inflated 3D ConvNet (I3D)) features.

By evaluating on AVSD at DSTC7 with objective metrics, performance of the AVSD system 100 is compared with four baselines methods, such as a baseline method, a multimodal attention method, a simple method and an MTN method. The baseline method is based on DSTC challenge that extracts features for different modalities. The extracted features of the different modalities are combined using simple concatenation or addition for generating a response to an input query. The multimodal attention method implements a multimodal attention that utilizes attention to selectively focus on salient features for the response generation. The simple method adds image features, such as VGG feature and factor graph attention for the response generation. The MTN method applies self-attention and co-attention to aggregate information between video, audio, and multi-turn dialog information. Besides, an answer auto-encoding loss has been applied to boost the performance.

Figure 10B:
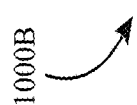
FIG. 10B shows a table depicting comparison of the AVSD system with baselines on test split of AVSD challenge at DSTC8, according to some embodiments.

FIG. 10B shows a table 1000B shows depicting comparison of the AVSD system 100 with baseline methods on test split of AVSD challenge at Dialog System Technology Challenge 8 (DSTC8), according to some embodiments. In the table 1000B, quantitative results on DSTC8 test split with extra human ratings are shown. The results show that the AVSD system 100 improves previous baselines by utilizing scene graphs to represent visual information of a video. As shown in the table 1000B, the AVSD system 100 improves human rating to 3.433 than the simple method with a relative 12% increase.

Exemplar Embodiments

Figure 11:
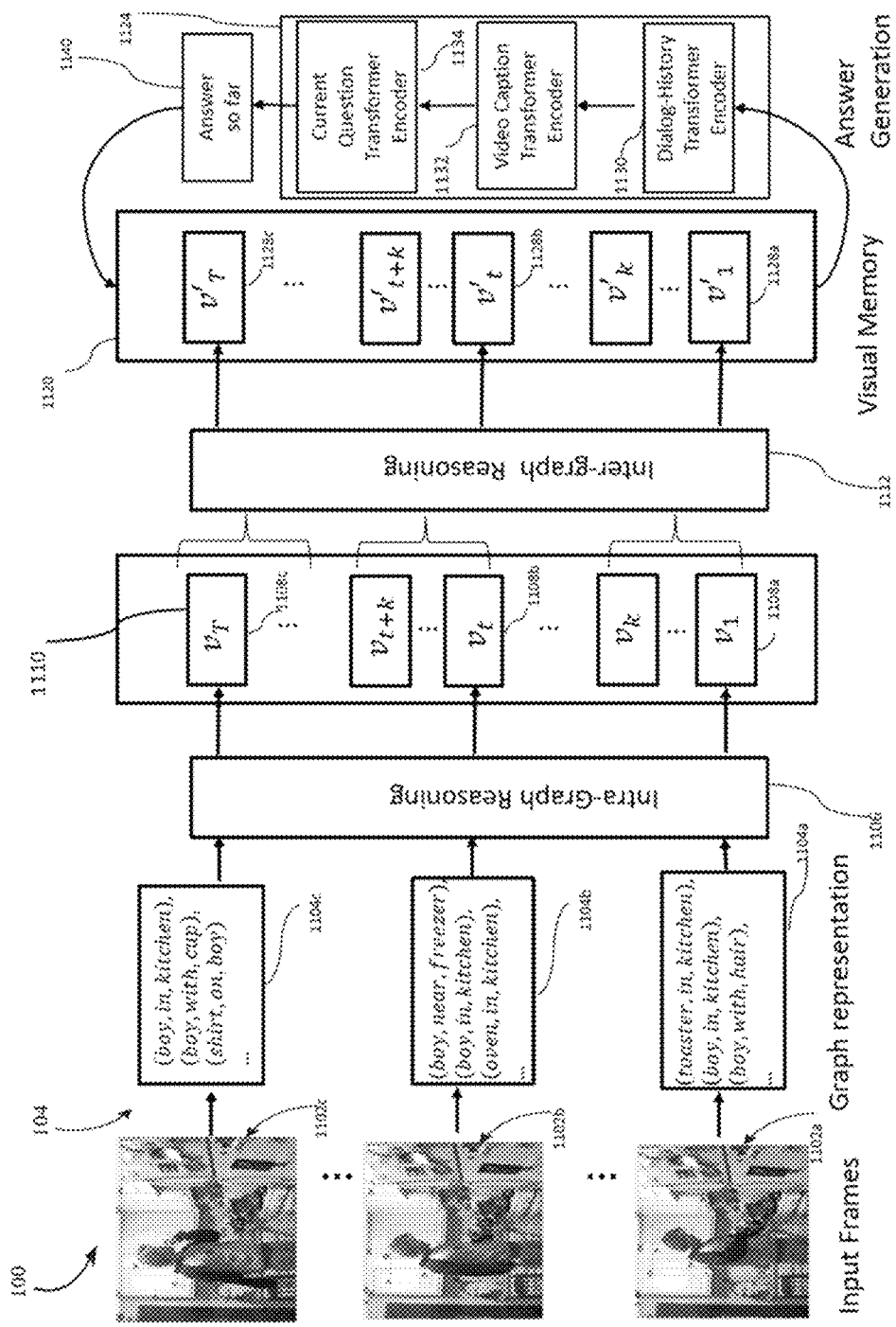
FIG. 11 shows a detailed schematic overview of principles of the AVSD system for generating a response to a query, according to some embodiments.

FIG. 11 shows a schematic overview 1100 of principles of the AVSD system 100, according to some embodiments. The AVSD system 100 receives an input sequence of video frames 1102a-1102c and contextual information 1130, 1132, 1134. The processor 104 generates scene graph representation 1104a-1104c for the sequence of video frames 1102a-202c. The scene graph representation 1104a-1104c corresponds to the scene graph representations 206a-206c as described in description of FIG. 2B. The scene graph representation 1104a-1104c is a semantic representation of a scene in a frame. From the scene graph representation 1104a-1104c, visual graph memories (e.g., the visual graph memories 1108a-1108c) are generated by intra-graph reasoning 306, as described in description of FIG. 2C.

The processor 104 utilizes the visual graph memories 1108a-1108c for inter-graph information aggregation 1112 to generate final graph memories, i.e. the graph memories 1128a-1128c. The final graph memories 1128a-1128c are provided as an input for the semantic-controlled transformer 1124. Further, the processor 104 is configured to execute the semantic-controlled transformer reasoning 1124, to encode the final graph memories 1128a-1128c, the contextual information 304 and the input query 1134 to generate the output response 1140. In some embodiments, the input query 1134 is provided to the semantic-controlled transformer 300 to execute the semantics-controlled transformer reasoning 1124. The semantics-controlled transformer reasoning 1124 generates probability distribution of next token of a word for all tokens of words in the vocabulary for the output response 1140. The reasoning process of the semantics-controlled transformer reasoning 1140 is controlled based on concatenated visual graph memories 214a-214d and final graph memories 218a-218d.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. A scene-aware dialog system, comprising: an input interface configured to receive a sequence of video frames, contextual information, and a query: a memory configured to store at least one neural network comprising a visual scene-aware dialog neural network trained to generate a response to the input query by analyzing one or combination of the input sequence of video frames and the input contextual information provided to the neural network; a processor configured to detect and classify objects in each video frame of the sequence of video frames; integrate region of interests of objects in the sequence of video frames to determine relationships among the classified objects in each of the video frame, wherein at least one video frame of the sequence of video frames includes at least two classified objects, and wherein the relationship between the two classified objects is an intra-frame object relationship confined within the video frame; extract features representing the classified objects and the determined relationships for each of the video frame to produce a sequence of feature vectors, wherein there is one feature vector for one video frame; and submit the sequence of feature vectors, the input query and the input contextual information to the neural network to generate a response to the input query; and an output interface to render the response to the input query.

2. The scene-aware dialog system of claim 1, wherein the input query concerns one or combination of objects, relationships among the objects, and temporal evolutions of the objects in the input sequence of video frames, and wherein the contextual information includes one or combination of audio information and textual information about the input video, such that the neural network is a multi-modal neural network configured to process information of modalities.

3. The scene-aware dialog system of claim 2, wherein the processor is further configured to modify values of each feature vector of the sequence of feature vectors with weighted values of neighboring feature vectors in the sequence of feature vectors.

4. The scene-aware dialog system of claim 3, wherein the values of each of the feature vector are determined as a weighted combination of values of multiple feature vectors fitting a window centered on the feature vector.

5. The scene-aware dialog system of claim 3, wherein the at least one neural network stored in the memory includes an audio visual scene aware dialog (AVSD) neural network trained to prepare the response to the input query, a feature extraction neural network trained to represent the objects and the corresponding relationships among the objects in the sequence of video frames with the sequence of feature vectors, and an aggregation neural network trained to determine the values of each feature vectors of the sequence of feature vectors as a weighted combination of values of multiple feature vectors fitting the window centered on the feature vector.

6. The scene-aware dialog system of claim 5, wherein the AVSD neural network corresponds to an attention-based architecture and includes one or combination of a faster region-based convolutional neural network (faster RCNN) and a 3-dimensional (3D) convolutional neural network (CNN).

7. The scene-aware dialog system of claim 1, wherein the memory stores a set of neural network based classifiers comprising an object classifier configured to detect and classify a predefined type of objects in the input sequence of video frames and a relationship classifier to classify relationships among the classified objects, and wherein the processor is configured to select and execute the selected neural network based classifiers to detect and classify the objects and corresponding relationships among the classified objects in each video frame of the input sequence of video frames.

8. The scene-aware dialog system of claim 7, wherein the processor is further configured to select the object classifier and the relationship classifier from the set of neural network based classifiers based on the input sequence of video frames, the input contextual information, the input query or combination thereof.

9. The scene-aware dialog system of claim 1, wherein the memory stores an object and a relationship classifiers configured to detect and classify objects and their relationship relevant for generating navigation instructions for driving a vehicle, and wherein the processor is configured to generate a navigation instruction using a description and a relationships of an object pertinent to a navigation route to a destination of the vehicle.

10. The scene-aware dialog system of claim 1, wherein the processor is further configured to generate a spatio-temporal scene graph representation (STSGR) model for each frame of the sequence of video frames based on an integrated region of interests and the visual memory, and wherein the at least one neural network is trained to perform spatio-temporal relational learning on training STSGR models of the sequence of video frames to generate responses to training queries.

11. The scene-aware dialog system of claim 10, wherein each STSGR model represents each corresponding video frame as a spatio-temporal visual graphs stream and a semantic graph stream, and wherein the at least one neural network is a multi-head shuffled transformer for generating an object-level graph reasoning, the multi-head shuffled transformer enable shuffling heads of the sequence of feature vectors.

12. The scene-aware dialog system of claim 1, wherein the processor is further configured to aggregate the classified objects and the determined relationships for generating visual memory for each video frame of the sequence of video frames.

13. A scene-aware dialog method, wherein the method uses a processor coupled with stored instructions implementing the method, wherein the instructions, when executed by the processor carry out steps of the method, comprising:
  receiving a sequence of video frames, contextual information, and a query;
  detecting and classifying objects in each video frame of the sequence of video frames;
  integrating region of interests of objects in the sequence of video frames for determining relationships among the classified objects in each of the video frame, wherein at least one video frame of the sequence of video frames includes at least two classified objects, and wherein the relationship between the two classified objects is an intra-frame object relationship confined within the video frame;
  extracting features representing the classified objects and the determined relationships for each of the video frame to produce a sequence of feature vectors, wherein there is one feature vector for one video frame;
  submitting the sequence of feature vectors, the input query and the input contextual information to at least one neural network comprising a visual scene-aware dialog neural network trained to generate a response to the input query by analyzing one or combination of input sequence of video frames and the input contextual information; and
  rendering the response to the input query via an output interface.

14. The method of claim 13, wherein the input query concerns one or combination of objects, relationships among the objects, and temporal evolutions of the objects in the input sequence of video frames, and wherein the contextual information includes one or combination of audio information and textual information about the input video, such that the neural network is a multi-modal neural network configured to process information of different modalities.

15. The method of claim 14, further comprising modifying values of each feature vector of the sequence of feature vectors with weighted values of neighboring feature vectors in the sequence of feature vectors, the values of the of each of the feature vector are determined as a weighted combination of values of multiple feature vectors fitting a window centered on the feature vector.

16. The method of claim 15, wherein the at least one neural network includes an audio visual scene aware dialog (AVSD) neural network trained to prepare the response to the input query, a feature extraction neural network trained to represent the objects and the corresponding relationship among the objects in the sequence of video frames with the sequence of feature vectors, and an aggregation neural network trained to determine values of each feature vectors of the sequence of feature vectors as a weighted combination of values of multiple feature vectors fitting the window centered on the feature vector.

17. The method of claim 16, further comprising selecting an object classifier and a relationship classifier from a set of neural network based classifiers and executing the selected object classifier for detecting and classifying a predefined type of objects in the input sequence of video frames and the relationship classifier for classifying relationships among the classified objects, the selection of the neural network based classifiers based on the input contextual information, the input sequence of video frames, the input query, or combination thereof.

18. The method of claim 13, further comprising generating a spatio-temporal scene graph representation (STSGR) model for each frame of the sequence of video frames, each STSGR model represents each corresponding video frame as a spatio-temporal visual graphs stream and a semantic graph stream, wherein the at least one neural network is a multi-head shuffled transformer for generating an object-level graph reasoning and wherein the neural network is trained to perform spatio-temporal relational learning on training STSGR models of the sequence of video frames to generate responses to training queries.

19. The method of claim 13, further comprising aggregating the classified objects and the determined relationships for generating visual memory for each video frame of the sequence of video frames.

20. A scene-aware dialog system, comprising: an input interface configured to receive a sequence of video frames, contextual information, and a query; a memory configured to store at least one neural network comprising a visual scene-aware dialog neural network trained to generate a response to the input query by analyzing one or combination of the input sequence of video frames and the input contextual information provided to the neural network, wherein the input query concerns one or combination of objects, relationships among the objects, and temporal evolutions of the objects in the input sequence of video frames, and wherein the contextual information includes one or combination of audio information and textual information about the input video, such that the neural network is a multi-modal neural network configured to process information of modalities; a processor configured to detect and classify objects in each video frame of the sequence of video frames; determine relationships among the classified objects in each of the video frame, wherein at least one video frame of the sequence of video frames includes at least two classified objects, and wherein the relationship between the two classified objects is an intra-frame object relationship confined within the video frame; extract features representing the classified objects and the determined relationships for each of the video frame to produce a sequence of feature vectors, wherein there is one feature vector for one video frame; modify values of each feature vector of the sequence of feature vectors with weighted values of neighboring feature vectors in the sequence of feature vectors; and submit the sequence of feature vectors, the input query and the input contextual information to the neural network to generate a response to the input query; and an output interface to render the response to the input query.

21. A scene-aware dialog system, comprising:
an input interface configured to receive a sequence of video frames, contextual information, and a query;
a memory configured to store:
  at least one neural network comprising a visual scene-aware dialog neural network trained to generate a response to the input query by analyzing one or combination of input sequence of video frames and the input contextual information provided to the neural network; and
  a set of neural network based classifiers comprising an object classifier configured to detect and classify a predefined type of objects in the input sequence of video frames and a relationship classifier to classify relationships among the classified objects;
a processor configured to:
  select the object classifier and the relationship classifier from the set of neural network based classifiers based on the input sequence of video frames, the input contextual information, the input query or combination thereof;
  execute the selected object classifier and relationship classifier to detect and classify objects and corresponding relationships among the classified objects in each video frame of the input sequence of video frames;
  determine relationships among the classified objects in each of the video frame, wherein at least one video frame of the sequence of video frames includes at least two classified objects, and wherein the relationship between the two classified objects is an intra-frame object relationship confined within the video frame;
  extract features representing the classified objects and the determined relationships for each of the video frame to produce a sequence of feature vectors, wherein there is one feature vector for one video frame; and
  submit the sequence of feature vectors, the input query and the input contextual information to the neural network to generate a response to the input query; and
an output interface to render the response to the input query.

22. A scene-aware dialog system, comprising: an input interface configured to receive a sequence of video frames, contextual information, and a query; a memory configured to store: at least one neural network comprising a visual scene-aware dialog neural network trained to generate a response to the input query by analyzing one or combination of input sequence of video frames and the input contextual information provided to the neural network; and an object classifier and a relationship classifier configured to detect and classify objects and their relationship relevant for generating navigation instructions for driving a vehicle; a processor configured to detect and classify objects in each video frame of the sequence of video frames; determine relationships among the classified objects in each of the video frame, wherein at least one video frame of the sequence of video frames includes at least two classified objects, and wherein the relationship between the two classified objects is an intra-frame object relationship confined within the video frame; extract features representing the classified objects and the determined relationships for each of the video frame to produce a sequence of feature vectors, wherein there is one feature vector for one video frame; and submit the sequence of feature vectors, the input query and the input contextual information to the neural network to generate a response to the input query; and an output interface to render the response to the input query, wherein the processor is further configured to generate a navigation instruction using a description and a relationships of an object pertinent to a navigation route to a destination of the vehicle.

23. A scene-aware dialog system, comprising: an input interface configured to receive a sequence of video frames, contextual information, and a query; a memory configured to store at least one neural network comprising a visual scene-aware dialog neural network trained to generate a response to the input query by analyzing one or combination of the input sequence of video frames and the input contextual information provided to the neural network; a processor configured to detect and classify objects in each video frame of the sequence of video frames; determine relationships among the classified objects in each of the video frame, wherein at least one video frame of the sequence of video frames includes at least two classified objects, and wherein the relationship between the two classified objects is an intra-frame object relationship confined within the video frame; extract features representing the classified objects and the determined relationships for each of the video frame to produce a sequence of feature vectors, wherein there is one feature vector for one video frame; and submit the sequence of feature vectors, the input query and the input contextual information to the neural network to generate a response to the input query; and an output interface to render the response to the input query, wherein the processor is further configured to generate a spatio-temporal scene graph representation (STSGR) model for each frame of the sequence of video frames based on an integrated region of interests and the visual memory, and wherein the at least one neural network is trained to perform spatio-temporal relational learning on training STSGR models of the sequence of video frames to generate responses to training queries.

24. A scene-aware dialog method, wherein the method uses a processor coupled with stored instructions implementing the method, wherein the instructions, when executed by the processor carry out steps of the method, comprising:
receiving a sequence of video frames, contextual information, and a query, wherein the input query concerns one or combination of objects in the input sequence of video frames, relationships among the objects in the input sequence of video frames, and temporal evolutions of the objects in the input sequence of video frames, and wherein the contextual information includes one or combination of audio information and textual information about the input video;
detecting and classifying objects in each video frame of the sequence of video frames;
determining relationships among the classified objects in each of the video frame, wherein at least one video frame of the sequence of video frames includes at least two classified objects, and wherein the relationship between the two classified objects is an intra-frame object relationship confined within the video frame;
extracting features representing the classified objects and the determined relationships for each of the video frame to produce a sequence of feature vectors, wherein there is one feature vector for one video frame;
modifying values of each feature vector of the sequence of feature vectors with weighted values of neighboring feature vectors in the sequence of feature vectors, the values of the of each of the feature vector are determined as a weighted combination of values of multiple feature vectors fitting a window centered on the feature vector;
submitting the sequence of feature vectors, the input query and the input contextual information to at least one neural network comprising a visual scene-aware dialog neural network trained to generate a response to the input query by analyzing one or combination of input sequence of video frames and the input contextual information, wherein the at least one neural network is a multi-modal neural network configured to process information of different modalities; and
rendering the response to the input query via an output interface.

25. A scene-aware dialog method, wherein the method uses a processor coupled with stored instructions implementing the method, wherein the instructions, when executed by the processor carry out steps of the method, comprising:
receiving a sequence of video frames, contextual information, and a query;
detecting and classifying objects in each video frame of the sequence of video frames;
determining relationships among the classified objects in each of the video frame, wherein at least one video frame of the sequence of video frames includes at least two classified objects, and wherein the relationship between the two classified objects is an intra-frame object relationship confined within the video frame;
extracting features representing the classified objects and the determined relationships for each of the video frame to produce a sequence of feature vectors, wherein there is one feature vector for one video frame;
generating a spatio-temporal scene graph representation (STSGR) model for each frame of the sequence of video frames, each STSGR model represents each corresponding video frame as a spatio-temporal visual graphs stream and a semantic graph stream;
submitting the sequence of feature vectors, the input query and the input contextual information to at least one neural network comprising a visual scene-aware dialog neural network trained to generate a response to the input query by analyzing one or combination of input sequence of video frames and the input contextual information, wherein the at least one neural network is a multi-head shuffled transformer for generating an object-level graph reasoning and wherein the neural network is trained to perform spatio-temporal relational learning on training STSGR models of the sequence of video frames to generate responses to training queries; and
rendering the response to the input query via an output interface.

* * * * *